US007851751B2

(12) United States Patent
Bateman

(10) Patent No.: US 7,851,751 B2
(45) Date of Patent: Dec. 14, 2010

(54) MASS ANALYSIS WITH ALTERNATING BYPASS OF A FRAGMENTATION DEVICE

(75) Inventor: Robert Harold Bateman, Cheshire (GB)

(73) Assignee: Micromass UH Limited, Manchester (GB)

( * ) Notice: Subject to any disclaimer, the term of this patent is extended or adjusted under 35 U.S.C. 154(b) by 208 days.

(21) Appl. No.: 12/272,213

(22) Filed: Nov. 17, 2008

(65) Prior Publication Data

US 2009/0065690 A1 Mar. 12, 2009

Related U.S. Application Data

(63) Continuation of application No. 11/286,141, filed on Nov. 23, 2005, now abandoned, which is a continuation-in-part of application No. 10/464,576, filed on Jun. 19, 2003, now Pat. No. 7,112,784.

(60) Provisional application No. 60/412,800, filed on Sep. 24, 2002.

(30) Foreign Application Priority Data

Aug. 12, 2002 (GB) .................................. 0218719.3
Sep. 20, 2002 (GB) .................................. 0221914.5
Mar. 13, 2003 (GB) .................................. 0305796.5
Jun. 19, 2003 (GB) .................................. 0217146.0

(51) Int. Cl.
*B01D 59/44* (2006.01)
*H01J 49/00* (2006.01)

(52) U.S. Cl. ....................... 250/288; 250/281; 250/282; 250/284; 250/286; 250/290

(58) Field of Classification Search ....................... None
See application file for complete search history.

(56) References Cited

U.S. PATENT DOCUMENTS

| | | | | |
|---|---|---|---|---|
| 5,298,743 | A * | 3/1994 | Kato | 250/288 |
| 5,661,298 | A * | 8/1997 | Bateman | 250/281 |
| 5,744,798 | A * | 4/1998 | Kato | 250/288 |
| 6,002,130 | A * | 12/1999 | Kato | 250/289 |
| 6,087,657 | A * | 7/2000 | Kato | 250/288 |
| 7,417,226 | B2 * | 8/2008 | Bajic et al. | 250/288 |
| 7,759,638 | B2 * | 7/2010 | Makarov | 250/287 |
| 2007/0114439 | A1 * | 5/2007 | Bajic et al. | 250/426 |
| 2008/0224033 | A1 * | 9/2008 | Makarov | 250/287 |
| 2009/0065690 | A1 * | 3/2009 | Bateman | 250/282 |
| 2009/0206248 | A1 * | 8/2009 | Makarov et al. | 250/283 |
| 2009/0272895 | A1 * | 11/2009 | Makarov | 250/283 |

* cited by examiner

*Primary Examiner*—David A Vanore
(74) *Attorney, Agent, or Firm*—Jamie H. Rose

(57) ABSTRACT

A method for analyzing a mixture of components includes forming precursor ions from the components, alternately causing the precursor ions to pass to and to by-pass a fragmentation device, to form product ions from the precursor ions that pass to the device and to form substantially fewer product ions from precursor ions that by-pass the device, and obtaining mass spectra from product ions received from the device and from precursor ions that by-passed the device. An apparatus for analyzing a sample includes an ion source for forming precursor ions from the components of the sample, a fragmentation device for forming product ions from the precursor ions, a by-pass device disposed upstream of the fragmentation device for switchable by-pass of the fragmentation device, and a mass analyzer.

20 Claims, 14 Drawing Sheets

MASS ANALYSIS WITH ALTERNATING BYPASS OF A FRAGMENTATION DEVICE

CROSS REFERENCE TO RELATED APPLICATIONS

This is a continuation of U.S. application Ser. No. 11/286,141, filed Nov. 23, 2005, which is a continuation-in-part of U.S. application Ser. No. 10/464,576, filed 19 Jun. 2003, which claims priority to United Kingdom Patent Applications having Nos. 0217146.0, filed 24 Jul. 2002, 0218719.3, filed 12 Aug. 2002, 0221914.5, filed 20 Sep. 2002, and 0305796.5, filed 13 Mar. 2003, and priority to U.S. Provisional Application No. 60/412,800, filed 24 Sep. 2002. The entire contents of these applications are incorporated herein by reference.

FIELD OF INVENTION

The present invention relates to a method of mass spectrometry and a mass spectrometer.

BACKGROUND OF INVENTION

It has become common practice to analyse proteins by first enzymatically or chemically digesting the protein and then analysing the peptide products by mass spectrometry. The mass spectrometry analysis of the peptide products normally entails measuring the mass of the peptide products. This method is sometimes referred to as "peptide mapping" or "peptide fingerprinting".

It is also known to induce parent or precursor peptide ions to fragment and to then measure the mass of one or more fragment or daughter ions as a way of seeking to identify the parent or precursor peptide ion. The fragmentation pattern of a peptide ion has also been shown to be a successful way of distinguishing isobaric peptide ions. Thus the mass to charge ratio of one or more fragment or daughter ions may be used to identify the parent or precursor peptide ion and hence the protein from which the peptide was derived. In some instances the partial sequence of the peptide can also be determined from the fragment or daughter ion spectrum. This information may be used to determine candidate proteins by searching protein and genomic databases.

Alternatively, a candidate protein may be eliminated or confirmed by comparing the masses of one or more observed fragment or daughter ions with the masses of fragment or daughter ions which might be expected to be observed based upon the peptide sequence of the candidate protein in question. The confidence in the identification increases as more peptide parent or precursor ions are induced to fragment and their fragment masses are shown to match those expected.

SUMMARY OF INVENTION

According to an aspect of the present invention, there is provided a method for analyzing a mixture of components. The method includes forming precursor ions from the components, alternately causing the precursor ions to pass to and to by-pass a collision, fragmentation or reaction device to form product ions from the precursor ions that pass to the device and to form substantially fewer product ions from precursor ions that by-pass the device, and obtaining mass spectra from ions alternately received from the collision, fragmentation or reaction device and from ions that by-passed the collision, fragmentation or reaction device. According to another aspect of the present invention, there is provided an apparatus for analyzing a sample. The apparatus includes an ion source for forming precursor ions from components of the sample, a collision, fragmentation or reaction device for forming product ions from the precursor ions, a by-pass device switchably disposed upstream of the collision, fragmentation or reaction device, and a mass analyzer.

According to another aspect of the present invention there is provided a method of mass spectrometry comprising:

passing parent or precursor ions from a first sample to a collision, fragmentation or reaction device;

repeatedly switching, altering or varying the collision, fragmentation or reaction device between a first mode wherein at least some of the parent or precursor ions from the first sample are fragmented or reacted into one or more fragment, product, daughter or adduct ions and a second mode wherein substantially fewer parent or precursor ions are fragmented or reacted;

passing parent or precursor ions from a second sample to a collision, fragmentation or reaction device;

repeatedly switching, altering or varying the collision, fragmentation or reaction device between a first mode wherein at least some of the parent or precursor ions from the second sample are fragmented or reacted into one or more fragment, product, daughter or adduct ions and a second mode wherein substantially fewer parent or precursor ions are fragmented or reacted;

recognising first parent or precursor ions of interest from the first sample;

automatically determining the intensity of the first parent or precursor ions of interest, the first parent or precursor ions of interest having a first mass to charge ratio;

automatically determining the intensity of second parent or precursor ions from the second sample which have the same first mass to charge ratio; and comparing the intensity of the first parent or precursor ions of interest with the intensity of the second parent or precursor ions;

wherein the collision, fragmentation or reaction device is selected from the group consisting of: (i) a Surface Induced Dissociation ("SID") collision, fragmentation or reaction device; (ii) an Electron Transfer Dissociation collision, fragmentation or reaction device; (iii) an Electron Capture Dissociation collision, fragmentation or reaction device; (iv) an Electron Collision or Impact Dissociation collision, fragmentation or reaction device; (v) a Photo Induced Dissociation ("PID") collision, fragmentation or reaction device; (vi) a Laser Induced Dissociation collision, fragmentation or reaction device; (vii) an infrared radiation induced dissociation device; (viii) an ultraviolet radiation induced dissociation device; (ix) a nozzle-skimmer interface collision, fragmentation or reaction device; (x) an in-source collision, fragmentation or reaction device; (xi) an ion-source Collision Induced Dissociation collision, fragmentation or reaction device; (xii) a thermal or temperature source collision, fragmentation or reaction device; (xiii) an electric field induced collision, fragmentation or reaction device; (xiv) a magnetic field induced collision, fragmentation or reaction device; (xv) an enzyme digestion or enzyme degradation collision, fragmentation or reaction device; (xvi) an ion-ion reaction collision, fragmentation or reaction device; (xvii) an ion-molecule reaction collision, fragmentation or reaction device; (xviii) an ion-atom reaction collision, fragmentation or reaction device; (xix) an ion-metastable ion reaction collision, fragmentation or reaction device; (xx) an ion-metastable molecule reaction collision, fragmentation or reaction device; (xxi) an ion-metastable atom reaction collision, fragmentation or reaction device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another aspect of the present invention there is provided a method of mass spectrometry comprising:

passing parent or precursor ions from a first sample to a collision, fragmentation or reaction device;

repeatedly switching, altering or varying the collision, fragmentation or reaction device between a first mode wherein at least some of the parent or precursor ions from the first sample are fragmented or reacted into one or more fragment, product, daughter or adduct ions and a second mode wherein substantially fewer parent or precursor ions are fragmented or reacted;

passing parent or precursor ions from a second sample to a collision, fragmentation or reaction device;

repeatedly switching, altering or varying the collision, fragmentation or reaction device between a first mode wherein at least some of the parent or precursor ions from the second sample are fragmented or reacted into one or more fragment, product, daughter or adduct ions and a second mode wherein substantially fewer parent or precursor ions are fragmented or reacted;

recognising first parent or precursor ions of interest from the first sample;

automatically determining the intensity of the first parent or precursor ions of interest, the first parent or precursor ions of interest having a first mass to charge ratio;

automatically determining the intensity of second parent or precursor ions from the second sample which have the same first mass to charge ratio;

determining a first ratio of the intensity of the first parent or precursor ions of interest to the intensity of other parent or precursor ions in the first sample;

determining a second ratio of the intensity of the second parent or precursor ions to the intensity of other parent or precursor ions in the second sample; and comparing the first ratio with the second ratio;

wherein the collision, fragmentation or reaction device is selected from the group consisting of: (i) a Surface Induced Dissociation ("SID") collision, fragmentation or reaction device; (ii) an Electron Transfer Dissociation collision, fragmentation or reaction device; (iii) an Electron Capture Dissociation collision, fragmentation or reaction device; (iv) an Electron Collision or Impact Dissociation collision, fragmentation or reaction device; (v) a Photo Induced Dissociation ("PID") collision, fragmentation or reaction device; (vi) a Laser Induced Dissociation collision, fragmentation or reaction device; (vii) an infrared radiation induced dissociation device; (viii) an ultraviolet radiation induced dissociation device; (ix) a nozzle-skimmer interface collision, fragmentation or reaction device; (x) an in-source collision, fragmentation or reaction device; (xi) an ion-source Collision Induced Dissociation collision, fragmentation or reaction device; (xii) a thermal or temperature source collision, fragmentation or reaction device; (xiii) an electric field induced collision, fragmentation or reaction device; (xiv) a magnetic field induced collision, fragmentation or reaction device; (xv) an enzyme digestion or enzyme degradation collision, fragmentation or reaction device; (xvi) an ion-ion reaction collision, fragmentation or reaction device; (xvii) an ion-molecule reaction collision, fragmentation or reaction device; (xviii) an ion-atom reaction collision, fragmentation or reaction device; (xix) an ion-metastable ion reaction collision, fragmentation or reaction device; (xx) an ion-metastable molecule reaction collision, fragmentation or reaction device; (xxi) an ion-metastable atom reaction collision, fragmentation or reaction device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

A reaction device should be understood as comprising a device wherein ions, atoms or molecules are rearranged or reacted so as to form a new species of ion, atom or molecule. An X-Y reaction fragmentation device should be understood as meaning a device wherein X and Y combine to form a product which then fragments. This is different to a collision, fragmentation or reaction device per se wherein ions may be caused to fragment without first forming a product. An X-Y reaction device should be understood as meaning a device wherein X and Y combine to form a product which does not necessarily then fragment.

Other arrangements are also contemplated wherein instead of determining a first ratio of first parent or precursor ions to other parent or precursor ions, a first ratio of first parent or precursor ions to certain fragment, product, daughter or adduct ions may be determined. Similarly, a second ratio of second parent or precursor ions to certain fragment, product, daughter or adduct ions may be determined and the first and second ratios compared.

The other parent or precursor ions present in the first sample and/or the other parent or precursor ions present in the second sample may either be endogenous or exogenous to the sample. The other parent or precursor ions present in the first sample and/or the other parent or precursor ions present in the second sample may additionally used as a chromatographic retention time standard.

According to one embodiment parent or precursor ions, preferably peptide ions, from two different samples are analysed in separate experimental runs. In each experimental run parent or precursor ions are passed to a collision, fragmentation or reaction device. The collision, fragmentation or reaction device is preferably repeatedly switched, altered or varied between a fragmentation or reaction mode and a substantially non-fragmentation or reaction mode. The ions emerging from the collision, fragmentation or reaction device or which have been transmitted through the collision, fragmentation or reaction device are then preferably mass analysed. The intensity of parent or precursor ions having a certain mass to charge ratio in one sample are then compared with the intensity of parent or precursor ions having the same certain mass to charge ratio in the other sample. A direct comparison of the parent or precursor ion expression level may be made or the intensity of parent or precursor ions in a sample may first be compared with an internal standard. An indirect comparison may therefore be made between the ratio of parent or precursor ions in one sample relative to the intensity of parent or precursor ions relating to an internal standard and the ratio of parent or precursor ions in the other sample relative to the intensity of parent or precursor ions relating to preferably the same internal standard. A comparison of the two ratios may then be made. Although the preferred embodiment is described as relating to comparing the parent or precursor ion expression level in two samples, it is apparent that the expression level of parent or precursor ions in three or more samples may be compared.

Parent or precursor ions may be considered to be expressed significantly differently in two samples if their expression level preferably differs by more than 1%, 10%, 50%, 100%, 150%, 200%, 250%, 300%, 350%, 400%, 450%, 500%, 1000%, 5000% or 10000%.

In the high fragmentation or reaction mode the collision, fragmentation or reaction device may be supplied with a voltage greater than or equal to 15V, 20V, 25V, 30V, 50V, 100V, 150V or 200V. Similarly, in the low fragmentation or reaction mode the collision, fragmentation or reaction device may be supplied with a voltage less than or equal to 5V, 4.5V, 4V, 3.5V, 3V, 2.5V, 2V, 1.5V, 1V, 0.5V or substantially 0V. However, according to less preferred embodiments, voltages below 15V may be supplied in the first mode and/or voltages above 5V may be supplied in the second mode. For example, in either the first or the second mode a voltage of around 10V may be supplied. Preferably, the voltage difference between the two modes is at least 5V, 10V, 15V, 20V, 25V, 30V, 35V, 40V, 50V or more than 50V.

According to an embodiment in the high fragmentation or reaction mode at least 50% of the ions entering the collision, fragmentation or reaction device are arranged to have an energy greater than or equal to 10 eV for a singly charged ion or an energy greater than or equal to 20 eV for a doubly charged ion.

The collision, fragmentation or reaction device is preferably maintained at a pressure selected from the group consisting of: (i) greater than or equal to 0.0001 mbar; (ii) greater than or equal to 0.001 mbar; (iii) greater than or equal to 0.005 mbar; (iv) greater than or equal to 0.01 mbar; (v) between 0.0001 and 100 mbar; and (vi) between 0.001 and 10 mbar. Preferably, the collision, fragmentation or reaction device is maintained at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (x) greater than or equal to 5 mbar; and (xi) greater than or equal to 10 mbar. Preferably, the collision, fragmentation or reaction device is maintained at a pressure selected from the group consisting of: (i) less than or equal to 10 mbar; (ii) less than or equal to 5 mbar; (iii) less than or equal to 1 mbar; (iv) less than or equal to 0.5 mbar; (v) less than or equal to 0.1 mbar; (vi) less than or equal to 0.05 mbar; (vii) less than or equal to 0.01 mbar; (viii) less than or equal to 0.005 mbar; (ix) less than or equal to 0.001 mbar; (x) less than or equal to 0.0005 mbar; and (xi) less than or equal to 0.0001 mbar.

According to a less preferred embodiment, gas in the collision, fragmentation or reaction device may be maintained at a first pressure when the collision, fragmentation or reaction device is in the high fragmentation or reaction mode and at a second lower pressure when the collision, fragmentation or reaction device is in the low fragmentation or reaction mode. According to another less preferred embodiment, gas in the collision, fragmentation or reaction device may comprise a first gas or a first mixture of gases when the collision, fragmentation or reaction device is in the high fragmentation or reaction mode and a second different gas or a second different mixture of gases when the collision, fragmentation or reaction device is in the low fragmentation or reaction mode.

Parent ions which are considered to be parent or precursor ions of interest are preferably identified. This may comprise determining the mass to charge ratio of the parent or precursor ions of interest, preferably accurately to less than or equal to 20 ppm, 15 ppm, 10 ppm or 5 ppm. The determined mass to charge ratio of the parent or precursor ions of interest may then be compared with a database of ions and their corresponding mass to charge ratios and hence the identity of the parent or precursor ions of interest can be established.

According to the preferred embodiment the step of identifying the parent or precursor ions of interest comprises identifying one or more fragment, product, daughter or adduct ions which are determined to result from fragmentation of the parent or precursor ions of interest. Preferably, the step of identifying one or more fragment, product, daughter or adduct ions further comprises determining the mass to charge ratio of the one or more fragment, product, daughter or adduct ions to less than or equal to 20 ppm, 15 ppm, 10 ppm or 5 ppm.

The step of identifying first parent or precursor ions of interest may comprise determining whether parent or precursor ions are observed in a mass spectrum obtained when the collision, fragmentation or reaction device is in a low fragmentation or reaction mode for a certain time period and the first fragment, product, daughter or adduct ions are observed in a mass spectrum obtained either immediately before the certain time period, when the collision, fragmentation or reaction device is in a high fragmentation or reaction mode, or immediately after the certain time period, when the collision, fragmentation or reaction device is in a high fragmentation or reaction mode.

The step of identifying first parent or precursor ions of interest may comprise comparing the elution times of parent or precursor ions with the pseudo-elution time of first fragment, product, daughter or adduct ions. The fragment, product, daughter or adduct ions are referred to as having a pseudo-elution time since fragment, product, daughter or adduct ions do not actually physically elute from a chromatography column. However, since at least some of the fragment, product, daughter or adduct ions are fairly unique to particular parent or precursor ions, and the parent or precursor ions may elute from the chromatography column only at particular times, then the corresponding fragment, product, daughter or adduct ions may similarly only be observed at substantially the same elution time as their related parent or precursor ions. Similarly, the step of identifying first parent or precursor ions of interest may comprise comparing the elution profiles of parent or precursor ions with the pseudo-elution profile of first fragment, product, daughter or adduct ions. Again, although fragment, product, daughter or adduct ions do not actually physically elute from a chromatography column, they can be considered to have an effective elution profile since they will tend to be observed only when specific parent or precursor ions elute from the column and as the intensity of the eluting parent or precursor ions varies over a few seconds so similarly the intensity of characteristic fragment, product, daughter or adduct ions will also vary in a similar manner.

Ions may be determined to be parent or precursor ions by comparing two mass spectra obtained one after the other, a first mass spectrum being obtained when the collision, fragmentation or reaction device was in a high fragmentation or reaction mode and a second mass spectrum obtained when the collision, fragmentation or reaction device was in a low fragmentation or reaction mode, wherein ions are determined to be parent or precursor ions if a peak corresponding to the ions in the second mass spectrum is more intense than a peak corresponding to the ions in the first mass spectrum. Similarly, ions may be determined to be fragment, product, daughter or adduct ions if a peak corresponding to the ions in the first mass spectrum is more intense than a peak corresponding to the ions in the second mass spectrum. According to another embodiment, a mass filter may be provided upstream of the collision, fragmentation or reaction device wherein the mass filter is arranged to transmit ions having mass to charge ratios within a first range but to substantially attenuate ions having mass to charge ratios within a second range and wherein ions are determined to be fragment, product, daughter or adduct ions if they are determined to have a mass to charge ratio falling within the second range.

The first parent or precursor ions and the second parent or precursor ions are preferably determined to have mass to charge ratios which differ by less than or equal to 40 ppm, 35 ppm, 30 ppm, 25 ppm, 20 ppm, 15 ppm, 10 ppm or 5 ppm. The first parent or precursor ions and the second parent or precursor ions may have been determined to have eluted from a chromatography column after substantially the same elution time. The first parent or precursor ions may also have been determined to have given rise to one or more first fragment, product, daughter or adduct ions and the second parent or precursor ions may have been determined to have given rise to one or more second fragment, product, daughter or adduct ions, wherein the one or more first fragment, product, daughter or adduct ions and the one or more second fragment, product, daughter or adduct ions have substantially the same mass to charge ratio. The mass to charge ratio of the one or more first fragment, product, daughter or adduct ions and the one or more second fragment, product, daughter or adduct ions may be determined to differ by less than or equal to 40 ppm, 35 ppm, 30 ppm, 25 ppm, 20 ppm, 15 ppm, 10 ppm or 5 ppm.

The first parent or precursor ions may also be determined to have given rise to one or more first fragment, product, daughter or adduct ions and the second parent or precursor ions may have been determined to have given rise to one or more second fragment, product, daughter or adduct ions and wherein the first parent or precursor ions and the second parent or precursor ions are observed in mass spectra relating to data obtained in the low fragmentation or reaction mode at a certain point in time and the one or more first and second fragment, product, daughter or adduct ions are observed in mass spectra relating to data obtained either immediately before the certain point in time, when the collision, fragmentation or reaction device is in the high fragmentation or reaction mode, or immediately after the certain point in time, when the collision, fragmentation or reaction device is in the high fragmentation or reaction mode.

The first parent or precursor ions may be determined to have given rise to one or more first fragment, product, daughter or adduct ions and the second parent or precursor ions may be determined to have given rise to one or more second fragment, product, daughter or adduct ions if the first fragment, product, daughter or adduct ions have substantially the same pseudo-elution time as the second fragment, product, daughter or adduct ions.

The first parent or precursor ions may be determined to have given rise to one or more first fragment, product, daughter or adduct ions and the second parent or precursor ions may be determined to have given rise to one or more second fragment, product, daughter or adduct ions and wherein the first parent or precursor ions are determined to have an elution profile which correlates with a pseudo-elution profile of a first fragment, product, daughter or adduct ion and wherein the corresponding second parent or precursor ions are determined to have an elution profile which correlates with a pseudo-elution profile of a second fragment, product, daughter or adduct ion.

According to another embodiment the first parent or precursor ions and the second parent or precursor ions which are being compared may be determined to be multiply charged. This may rule out a number of fragment, product, daughter or adduct ions which quite often tend to be singly charged. The first parent or precursor ions and the second parent or precursor ions may according to a more preferred embodiment be determined to have the same charge state. According to another embodiment, the parent or precursor ions being compared in the two different samples may be determined to give rise to fragment, product, daughter or adduct ions which have the same charge state.

The first sample and/or the second sample may comprise a plurality of different biopolymers, proteins, peptides, polypeptides, oligionucleotides, oligionucleosides, amino acids, carbohydrates, sugars, lipids, fatty acids, vitamins, hormones, portions or fragments of DNA, portions or fragments of cDNA, portions or fragments of RNA, portions or fragments of mRNA, portions or fragments of tRNA, polyclonal antibodies, monoclonal antibodies, ribonucleases, enzymes, metabolites, polysaccharides, phosphorylated peptides, phosphorylated proteins, glycopeptides, glycoproteins or steroids. The first sample and/or the second sample may also comprise at least 2, 5, 10, 20, 30, 40, 50, 60, 70, 80, 90, 100, 200, 300, 400, 500, 600, 700, 800, 900, 1000, 1500, 2000, 2500, 3000, 3500, 4000, 4500, or 5000 molecules having different identities.

The first sample may be taken from a diseased organism and the second sample may be taken from a non-diseased organism. Alternatively, the first sample may be taken from a treated organism and the second sample may be taken from a non-treated organism. According to another embodiment the first sample may be taken from a mutant organism and the second sample may be taken from a wild type organism.

Molecules from the first and/or second samples are preferably separated from a mixture of other molecules prior to being ionised by High Performance Liquid Chromatography ("HPLC"), anion exchange, anion exchange chromatography, cation exchange, cation exchange chromatography, ion pair reversed-phase chromatography, chromatography, single dimensional electrophoresis, multi-dimensional electrophoresis, size exclusion, affinity, reverse phase chromatography, Capillary Electrophoresis Chromatography ("CEC"), electrophoresis, ion mobility separation, Field Asymmetric Ion Mobility Separation ("FAIMS") or capillary electrophoresis.

According to a particularly preferred embodiment the first and second sample ions comprise peptide ions. The peptide ions preferably comprise the digest products of one or more proteins. An attempt may be made to identify a protein which correlates with parent peptide ions of interest. Preferably, a determination is made as to which peptide products are predicted to be formed when a protein is digested and it is then determined whether any predicted peptide product(s) correlate with parent or precursor ions of interest. A determination may also be made as to whether the parent or precursor ions of interest correlate with one or more proteins.

The first and second samples may be taken from the same organism or from different organisms.

A check may be made to confirm that the first and second parent or precursor ions being compared really are parent or precursor ions rather than fragment, product, daughter or adduct ions. A high fragmentation or reaction mass spectrum relating to data obtained in the high fragmentation or reaction mode may be compared with a low fragmentation or reaction mass spectrum relating to data obtained in the low fragmentation or reaction mode wherein the mass spectra were obtained at substantially the same time. A determination may be made that the first and/or the second parent or precursor ions are not fragment, product, daughter or adduct ions if the first and/or the second parent or precursor ions have a greater intensity in the low fragmentation or reaction mass spectrum relative to the high fragmentation or reaction mass spectrum. Similarly, fragment, product, daughter or adduct ions may be recognised by noting ions having a greater intensity in the high fragmentation or reaction mass spectrum relative to the low fragmentation or reaction mass spectrum.

Parent ions from the first sample and parent or precursor ions from the second sample are preferably passed to the same collision, fragmentation or reaction device. However, according to a less preferred embodiment, parent or precursor ions from the first sample and parent or precursor ions from the second sample may be passed to different collision, fragmentation or reaction devices.

According to another aspect of the present invention there is provided a mass spectrometer comprising:

a collision, fragmentation or reaction device which is arranged and adapted to be repeatedly switched in use between a first mode wherein at least some parent or precursor ions are fragmented or reacted into one or more fragment, product, daughter or adduct ions and a second mode wherein substantially fewer parent or precursor ions are fragmented or reacted;

a mass analyser; and a control system which in use:

(i) recognises first parent or precursor ions of interest from a first sample, said first parent or precursor ions of interest having a first mass to charge ratio;

(ii) determines the intensity of said first parent or precursor ions of interest;

(iii) determines the intensity of second parent or precursor ions from a second sample which have said same first mass to charge ratio; and (iv) compares the intensity of said first parent or precursor ions of interest with the intensity of said second parent or precursor ions;

wherein said collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another aspect of the invention there is provided a mass spectrometer comprising:

a collision, fragmentation or reaction device repeatedly switched in use between a first mode wherein at least some parent or precursor ions are fragmented or reacted into one or more fragment, product, daughter or adduct ions and a second mode wherein substantially fewer parent or precursor ions are fragmented or reacted;

a mass analyser; and a control system which in use:

(i) recognises first parent or precursor ions of interest from a first sample, said first parent or precursor ions of interest having a first mass to charge ratio;

(ii) determines the intensity of said first parent or precursor ions of interest;

(iii) determines the intensity of second parent or precursor ions from a second sample which have said same first mass to charge ratio;

(iv) determines a first ratio of the intensity of said first parent or precursor ions of interest to the intensity of other parent or precursor ions in said first sample;

(v) determines a second ratio of the intensity of said second parent or precursor ions to the intensity of other parent or precursor ions in said second sample; and (vi) compares said first ratio with said second ratio;

wherein said collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

The mass spectrometer preferably further comprises an ion source. The ion source is preferably selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source.

The ion source may comprise a pulsed or a continuous ion source.

According to an embodiment the ion source may comprise an Electrospray, Atmospheric Pressure Chemical Ionisation ("APCI"), Atmospheric Pressure Photo Ionisation ("APPI"), Matrix Assisted Laser Desorption Ionisation ("MALDI"), Laser Desorption Ionisation ("LDI"), Inductively Coupled Plasma ("ICP"), Fast Atom Bombardment ("FAB") or Liquid Secondary Ions Mass Spectrometry ("LSIMS") ion source. Such ion sources may be provided with an eluent over a period of time, the eluent having been separated from a mixture by means of liquid chromatography or capillary electrophoresis.

Alternatively, the ion source may comprise an Electron Impact ("EI"), Chemical Ionisation ("CI") or Field Ionisation ("FI") ion source. Such ion sources may be provided with an eluent over a period of time, the eluent having been separated from a mixture by means of gas chromatography.

The mass analyser may comprise a quadrupole mass filter, a Time of Flight ("TOF") mass analyser (an orthogonal acceleration Time of Flight mass analyser is particularly preferred), a 2D (linear) or 3D (doughnut shaped electrode with two endcap electrodes) ion trap, a magnetic sector analyser or a Fourier Transform Ion Cyclotron Resonance ("FTICR") mass analyser.

The collision, fragmentation or reaction device may comprise a quadrupole rod set, an hexapole rod set, an octopole or higher order rod set or an ion tunnel comprising a plurality of electrodes having apertures through which ions are transmitted. The apertures are preferably substantially the same size. The collision, fragmentation or reaction device may, more generally, comprise a plurality of electrodes connected to an AC or RF voltage supply for radially confining ions within the collision, fragmentation or reaction device. An axial DC voltage gradient may or may not be applied along at least a portion of the length of the ion tunnel collision, fragmentation or reaction device. The collision, fragmentation or reaction device may be housed in a housing or otherwise arranged so that a substantially gas-tight enclosure is formed around the collision, fragmentation or reaction device apart from an aperture to admit ions and an aperture for ions to exit from and optionally a port for introducing a gas. A gas such as helium, argon, nitrogen, air or methane may be introduced into the collision, fragmentation or reaction device.

Other arrangements are also contemplated wherein the collision, fragmentation or reaction device is not repeatedly switched, altered or varied between a high fragmentation or reaction mode and a low fragmentation or reaction mode. For example, the collision, fragmentation or reaction device may be left permanently ON and arranged to fragment or react ions received within the collision, fragmentation or reaction device. An electrode or other device may be provided upstream of the collision, fragmentation or reaction device. A high fragmentation or reaction mode of operation would occur when the electrode or other device allowed ions to pass to the collision, fragmentation or reaction device. A low fragmentation or reaction mode of operation would occur when the electrode or other device caused ions to by-pass the collision, fragmentation or reaction device and hence not be fragmented therein.

Other embodiments are also contemplated which would be useful where particular parent or precursor ions could not be easily observed since they co-eluted with other commonly observed peptide ions. In such circumstances the expression level of fragment, product, daughter or adduct ions is compared between two samples.

According to an arrangement there is disclosed a method of mass spectrometry comprising:

passing parent or precursor ions from a first sample to a collision, fragmentation or reaction device;

repeatedly switching, altering or varying the collision, fragmentation or reaction device between a first mode wherein at least some of the parent or precursor ions from the first sample are fragmented or reacted into one or more fragment, product, daughter or adduct ions and a second mode wherein substantially fewer parent or precursor ions are fragmented or reacted;

passing parent or precursor ions from a second sample to a collision, fragmentation or reaction device;

repeatedly switching, altering or varying the collision, fragmentation or reaction device between a first mode wherein at least some of the parent or precursor ions are fragmented or reacted into one or more fragment, product, daughter or adduct ions and a second mode wherein substantially fewer parent or precursor ions are fragmented or reacted;

automatically determining the intensity of first fragment, product, daughter or adduct ions derived from first parent or precursor ions from the first sample, the first fragment, product, daughter or adduct ions having a first mass to charge ratio;

automatically determining the intensity of second fragment, product, daughter or adduct ions derived from second parent or precursor ions from the second sample, the second fragment, product, daughter or adduct ions having the same first mass to charge ratio; and comparing the intensity of the first fragment, product, daughter or adduct ions with the intensity of the second fragment, product, daughter or adduct ions;

wherein if the intensity of the first fragment, product, daughter or adduct ions differs from the intensity of the second fragment, product, daughter or adduct ions by more than a predetermined amount then either the first parent or precursor ions and/or the second parent or precursor ions are considered to be parent or precursor ions of interest;

wherein the collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

In a similar manner, according to another arrangement there is disclosed a method of mass spectrometry comprising:

passing parent or precursor ions from a first sample to a collision, fragmentation or reaction device;

repeatedly switching, altering or varying the collision, fragmentation or reaction device between a first mode wherein at least some of the parent or precursor ions from the first sample are fragmented or reacted into one or more fragment, product, daughter or adduct ions and a second mode wherein substantially fewer parent or precursor ions are fragmented or reacted;

passing parent or precursor ions from a second sample to a collision, fragmentation or reaction device;

repeatedly switching, altering or varying the collision, fragmentation or reaction device between a first mode wherein at least some of the parent or precursor ions are fragmented or reacted into one or more fragment, product, daughter or adduct ions and a second mode wherein substantially fewer parent or precursor ions are fragmented or reacted;

automatically determining the intensity of first fragment, product, daughter or adduct ions derived from first parent or precursor ions from the first sample, the first fragment, product, daughter or adduct ions having a first mass to charge ratio;

automatically determining the intensity of second fragment, product, daughter or adduct ions derived from second parent or precursor ions from the second sample, the second fragment, product, daughter or adduct ions having the same first mass to charge ratio;

determining a first ratio of the intensity of the first fragment, product, daughter or adduct ions to the intensity of other parent or precursor ions in the first sample or with the intensity of other fragment, product, daughter or adduct ions derived from other parent or precursor ions in the first sample;

determining a second ratio of the intensity of the second fragment, product, daughter or adduct ions to the intensity of other parent or precursor ions in the second sample or with the intensity of other fragment, product, daughter or adduct ions derived from other parent or precursor ions in the second sample;

comparing the first ratio with the second ratio;

wherein if the first ratio differs from the second ratio by more than a predetermined amount then either the first parent or precursor ions and/or the second parent or precursor ions are considered to be parent or precursor ions of interest;

wherein the collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another arrangement there is disclosed a mass spectrometer comprising:

a collision, fragmentation or reaction device repeatedly switched, altered or varied in use between a first mode wherein at least some parent or precursor ions are fragmented or reacted into one or more fragment, product, daughter or adduct ions and a second mode wherein substantially fewer parent or precursor ions are fragmented or reacted;

a mass analyser; and a control system which in use:

(i) determines the intensity of first fragment, product, daughter or adduct ions derived from first parent or precursor ions from the first sample, the first fragment, product, daughter or adduct ions having a first mass to charge ratio;

(ii) determines the intensity of second fragment, product, daughter or adduct ions derived from second parent or precursor ions from the second sample, the second fragment, product, daughter or adduct ions having the same first mass to charge ratio; and (iii) compares the intensity of the first fragment, product, daughter or adduct ions with the intensity of the second fragment, product, daughter or adduct ions;

wherein if the intensity of the first fragment, product, daughter or adduct ions differs from the intensity of the second fragment, product, daughter or adduct ions by more than a predetermined amount then either the first parent or precursor ions and/or the second parent or precursor ions are considered to be parent or precursor ions of interest;

wherein the collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another arrangement there is disclosed a mass spectrometer comprising:

a collision, fragmentation or reaction device repeatedly switched, altered or varied in use between a first mode wherein at least some parent or precursor ions are fragmented or reacted into one or more fragment, product, daughter or adduct ions and a second mode wherein substantially fewer parent or precursor ions are fragmented or reacted;

a mass analyser; and a control system which in use:

(i) determines the intensity of first fragment, product, daughter or adduct ions derived from first parent or precursor ions from a first sample, the first fragment, product, daughter or adduct ions having a first mass to charge ratio;

(ii) determines the intensity of second fragment, product, daughter or adduct ions derived from second parent or precursor ions from a second sample, the second fragment, product, daughter or adduct ions having the same first mass to charge ratio;

(iii) determines a first ratio of the intensity of the first fragment, product, daughter or adduct ions to the intensity of other parent or precursor ions in the first sample or with the intensity of other fragment, product, daughter or adduct ions derived from other parent or precursor ions in the first sample;

(iv) determines a second ratio of the intensity of the second fragment, product, daughter or adduct ions to the intensity of other parent or precursor ions in the second sample or with the intensity of other fragment, product, daughter or adduct ions derived from other parent or precursor ions in the second sample; and (v) compares the first ratio with the second ratio;

wherein if the first ratio differs from the second ratio by more than a predetermined amount then either the first parent or precursor ions and/or the second parent or precursor ions are considered to be parent or precursor ions of interest;

wherein the collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another arrangement there is disclosed a method of mass spectrometry comprising:

passing parent or precursor ions from a first sample to a collision, fragmentation or reaction device;

repeatedly switching, altering or varying said collision, fragmentation or reaction device between a first mode wherein at least some of said parent or precursor ions from said first sample are fragmented or reacted into one or more fragment, product, daughter or adduct ions and a second mode wherein substantially fewer parent or precursor ions are fragmented or reacted;

passing parent or precursor ions from a second sample to a collision, fragmentation or reaction device;

repeatedly switching, altering or varying said collision, fragmentation or reaction device between a first mode wherein at least some of said parent or precursor ions from said second sample are fragmented or reacted into one or more fragment, product, daughter or adduct ions and a second mode wherein substantially fewer parent or precursor ions are fragmented or reacted;

automatically determining the intensity of first fragment, product, daughter or adduct ions derived from first parent or precursor ions from said first sample, said first fragment, product, daughter or adduct ions having a first mass to charge ratio;

automatically determining the intensity of second fragment, product, daughter or adduct ions derived from second parent or precursor ions from said second sample, said second fragment, product, daughter or adduct ions having said same first mass to charge ratio; and comparing the intensity of said first fragment, product, daughter or adduct ions with the intensity of said second fragment, product, daughter or adduct ions;

wherein if the intensity of said first fragment, product, daughter or adduct ions differs from the intensity of said second fragment, product, daughter or adduct ions by more than a predetermined amount then either said first parent or precursor ions and/or said second parent or precursor ions are considered to be parent or precursor ions of interest; and wherein said collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device;

(vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another arrangement there is disclosed a method of mass spectrometry comprising:

passing parent or precursor ions from a first sample to a collision, fragmentation or reaction device;

repeatedly switching, altering or varying said collision, fragmentation or reaction device between a first mode wherein at least some of said parent or precursor ions from said first sample are fragmented or reacted into one or more fragment, product, daughter or adduct ions and a second mode wherein substantially fewer parent or precursor ions are fragmented or reacted;

passing parent or precursor ions from a second sample to a collision, fragmentation or reaction device;

repeatedly switching, altering or varying said collision, fragmentation or reaction device between a first mode wherein at least some of said parent or precursor ions from said second sample are fragmented or reacted into one or more fragment, product, daughter or adduct ions and a second mode wherein substantially fewer parent or precursor ions are fragmented or reacted;

automatically determining the intensity of first fragment, product, daughter or adduct ions derived from first parent or precursor ions from said first sample, said first fragment, product, daughter or adduct ions having a first mass to charge ratio;

automatically determining the intensity of second fragment, product, daughter or adduct ions derived from second parent or precursor ions from said second sample, said second fragment, product, daughter or adduct ions having said same first mass to charge ratio;

determining a first ratio of the intensity of said first fragment, product, daughter or adduct ions to the intensity of other parent or precursor ions in said first sample or with the intensity of other fragment, product, daughter or adduct ions derived from other parent or precursor ions in said first sample;

determining a second ratio of the intensity of said second fragment, product, daughter or adduct ions to the intensity of other parent or precursor ions in said second sample or with the intensity of other fragment, product, daughter or adduct ions derived from other parent or precursor ions in said second sample;

comparing said first ratio with said second ratio;

wherein if said first ratio differs from said second ratio by more than a predetermined amount then either said first parent or precursor ions and/or said second parent or precursor ions are considered to be parent or precursor ions of interest; and wherein said collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another arrangement there is disclosed a mass spectrometer comprising:

a collision, fragmentation or reaction device which is arranged and adapted to be repeatedly switched, altered or varied in use between a first mode wherein at least some parent or precursor ions are fragmented or reacted into one or more fragment, product, daughter or adduct ions and a second mode wherein substantially fewer parent or precursor ions are fragmented or reacted;

a mass analyser; and a control system which in use:

(i) determines the intensity of first fragment, product, daughter or adduct ions derived from first parent or precursor ions from a first sample, said first fragment, product, daughter or adduct ions having a first mass to charge ratio;

(ii) determines the intensity of second fragment, product, daughter or adduct ions derived from second parent or precursor ions from a second sample, said second fragment, product, daughter or adduct ions having said same first mass to charge ratio; and (iii) compares the intensity of said first fragment, product, daughter or adduct ions with the intensity of said second fragment, product, daughter or adduct ions;

wherein if the intensity of said first fragment, product, daughter or adduct ions differs from the intensity of said second fragment, product, daughter or adduct ions by more than a predetermined amount then either said first parent or precursor ions and/or said second parent or precursor ions are considered to be parent or precursor ions of interest; and wherein said collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another arrangement there is disclosed a mass spectrometer comprising:

a collision, fragmentation or reaction device repeatedly switched, altered or varied in use between a first mode wherein at least some parent or precursor ions are fragmented into one or more fragment, product, daughter or adduct ions and a second mode wherein substantially fewer parent or precursor ions are fragmented;

a mass analyser; and a control system which in use:

(i) determines the intensity of first fragment, product, daughter or adduct ions derived from first parent or precursor ions from a first sample, said first fragment, product, daughter or adduct ions having a first mass to charge ratio;

(ii) determines the intensity of second fragment, product, daughter or adduct ions derived from second parent or precursor ions from a second sample, said second fragment, product, daughter or adduct ions having said same first mass to charge ratio;

(iii) determines a first ratio of the intensity of said first fragment, product, daughter or adduct ions to the intensity of other parent or precursor ions in said first sample or with the intensity of other fragment, product, daughter or adduct ions derived from other parent or precursor ions in said first sample;

(iv) determines a second ratio of the intensity of said second fragment, product, daughter or adduct ions to the intensity of other parent or precursor ions in said second sample or with the intensity of other fragment, product, daughter or adduct ions derived from other parent or precursor ions in said second sample; and (v) compares said first ratio with said second ratio;

wherein if said first ratio differs from said second ratio by more than a predetermined amount then either said first parent or precursor ions and/or said second parent or precursor ions are considered to be parent or precursor ions of interest; and wherein said collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

It will be apparent that the above described arrangements which relate to comparing the expression level of fragment, daughter, product or adduct ions rather than parent or precursor ions either directly or indirectly may employ the method and apparatus relating to the preferred embodiment. Therefore the same preferred features which are recited with respect to the preferred embodiment may also be used with the arrangements which relate to comparing the expression level of fragment, product, daughter or adduct ions.

According to the preferred embodiment instead of comparing the expression levels of parent or precursor ions in two different samples and seeing whether the expression levels are significantly different so as to warrant further investigation, an initial recognition may instead be made that parent or precursor ions of interest are present in a sample.

According to a preferred embodiment, the step of recognising first parent or precursor ions of interest comprises recognising first fragment, product, daughter or adduct ions of interest.

The first fragment, product, daughter or adduct ions of interest may be optionally identified by, for example, determining their mass to charge ratio preferably to less than or equal to 20 ppm, 15 ppm, 10 ppm or 5 ppm.

Having recognised and optionally identified fragment, product, daughter or adduct ions of interest, it is then necessary to determine which parent or precursor ion gave rise to that fragment, product, daughter or adduct ion.

The step of recognising first parent or precursor ions of interest may comprise determining whether parent or precursor ions are observed in a mass spectrum obtained when the collision, fragmentation or reaction device is in a low fragmentation or reaction mode for a certain time period and first fragment, product, daughter or adduct ions of interest are observed in a mass spectrum obtained either immediately before the certain time period, when the collision, fragmentation or reaction device is in a high fragmentation or reaction mode, or immediately after the certain time period, when the collision, fragmentation or reaction device is in a high fragmentation or reaction mode.

The step of recognising first parent or precursor ions of interest may comprise comparing the elution times of parent or precursor ions with the pseudo-elution time of first fragment, product, daughter or adduct ions of interest. The step of recognising first parent or precursor ions of interest may also comprise comparing the elution profiles of parent or precursor ions with the pseudo-elution profile of first fragment, product, daughter or adduct ions of interest.

According to another less preferred embodiment, parent or precursor ions of interest may be recognised immediately by virtue of their mass to charge ratio without it being necessary to recognise and identify fragment, product, daughter or adduct ions of interest. According to this embodiment the step of recognising first parent or precursor ions of interest preferably comprises determining the mass to charge ratio of the parent or precursor ions preferably to less than or equal to 20 ppm, 15 ppm, 10 ppm or 5 ppm. The determined mass to charge ratio of the parent or precursor ions may then be compared with a database of ions and their corresponding mass to charge ratios.

According to another embodiment, the step of recognising first parent or precursor ions of interest comprises determining whether parent or precursor ions give rise to fragment, product, daughter or adduct ions as a result of the loss of a predetermined ion or a predetermined neutral particle.

Parent ions of interest may be identified in a similar manner to the preferred embodiment.

The other preferred features of the preferred embodiment apply equally to the other arrangement.

It will be apparent that the above described embodiments which relate to recognising parent or precursor ions of interest and comparing the expression level of parent or precursor ions of interest in one sample with corresponding parent or precursor ions in another sample may employ the method and apparatus relating to the preferred embodiment. Therefore, the same preferred features which are recited with respect to the preferred embodiment may also be used with the embodiments which relate to recognising parent or precursor ions of interest and then comparing the expression level of the parent or precursor ions of interest in one sample with corresponding parent or precursor ions in another sample.

If parent or precursor ions having a particular mass to charge ratio are expressed differently in two different samples, then according to the preferred embodiment further investigation of the parent or precursor ions of interest then occurs. This further investigation may comprise seeking to identify the parent or precursor ions of interest which are expressed differently in the two different samples. In order to verify that the parent or precursor ions whose expression levels are being compared in the two different samples really are the same ions, a number of checks may be made.

Measurements of changes in the abundance of proteins in complex protein mixtures can be extremely informative. For example, changes to the abundance of proteins in cells, often referred to as the protein expression level, could be due to different cellular stresses, the effect of stimuli, the effect of disease or the effect of drugs. Such proteins may provide relevant targets for study, screening or intervention. The identification of such proteins will normally be of interest. Such proteins may be identified by the method of the preferred embodiment.

Therefore, according to the preferred embodiment a new criterion for the discovery of parent or precursor ions of interest is based on the quantification of proteins in two different samples. This requires the determination of the relative abundances of their peptide products in two or more samples. However, the determination of relative abundance requires that the same peptide ions must be compared in the two (or more) different samples and ensuring that this happens is a non-trivial problem. Hence, it is necessary to be able to recognise and preferably identify the peptide ion to the extent that it can at least be uniquely recognised within the sample. Such peptide ions may be adequately recognised by measurement of the mass of the parent or precursor ion and by measurement of the mass to charge ratio of one or more fragment, product, daughter or adduct ions derived from that parent or precursor ion. The specificity with which the peptides may be recognised may be increased by the determination of the accurate mass of the parent or precursor ion and/or the accurate mass of one or more fragment, product, daughter or adduct ions.

The same method of recognising parent or precursor ions in one sample is also preferably used to recognise the same parent or precursor ions in another sample and this enables the relative abundances of the parent or precursor ions in the two different samples to be measured.

Measurement of relative abundances allows discovery of proteins with a significant change or difference in expression level of that protein. The same data allows identification of that protein by the method already described in which several or all fragment, product, daughter or adduct ions associated with each such peptide product ion is discovered by closeness of fit of their respective elution times. Again, the accurate measurement of the masses of the parent or precursor ion and associated fragment, product, daughter or adduct ions substantially improves the specificity and confidence with which the protein may be identified.

The specificity with which the peptides may be recognised may also be increased by comparison of retention times. For example, the HPLC or CE retention or elution times will be measured as part of the procedure for associating fragment, product, daughter or adduct ions with parent or precursor ions, and these elution times may also be compared for the two or more samples. The elution times may be used to reject measurements where they do not fall within a pre-defined time difference of each other. Alternatively, retention times may be used to confirm recognition of the same peptide when they do fall within a predefined window of each other. Commonly there may be some redundancy if the parent or precursor ion accurate mass, one or more fragment, product, daughter or adduct ion accurate masses, and the retention times are all measured and compared. In many instances just two of these measurements will be adequate to recognise the same peptide parent or precursor ion in the two or more samples. For example, measurement of just the accurate parent or precursor ion mass to charge ratio and a fragment, product, daughter or adduct ion mass to charge ratio, or the accurate parent or precursor ion mass to charge ratio and the retention time, may well be adequate. Nevertheless, the additional measurements may be used to confirm the recognition of the same parent peptide ion.

The relative expression levels of the matched parent peptide ions may be quantified by measuring the peak areas relative to an internal standard.

The preferred embodiment does not require any interruption to the acquisition of data and hence is particularly suitable for quantitative applications. According to an embodiment one or more endogenous peptides common to both mixtures which are not changed by the experimental state of the samples may used as an internal standard or standards for the relative peak area measurements. According to another embodiment an internal standard may be added to each sample where no such internal standard is present or can be relied upon. The internal standard, whether naturally present or added, may also serve as a chromatographic retention time standard as well as a mass accuracy standard.

Ideally more than one peptide parent or precursor ion may be measured for each protein to be quantified. For each peptide the same means of recognition is preferably used when comparing intensities in each of the different samples. The measurements of different peptides serves to validate the relative abundance measurements. Furthermore, the measurements from several peptides provides a means of determining the average relative abundance, and of determining the relative significance of the measurements.

According to one embodiment all parent or precursor ions may be identified and their relative abundances determined by comparison of their intensities to those of the same identity in one or more other samples.

In another embodiment the relative abundance of all parent or precursor ions of interest, discovered on the basis of their relationship to a predetermined fragment, product, daughter or adduct ion, may be determined by comparison of their intensities to those of the same identity in one or more other samples.

In another embodiment the relative abundance of all parent or precursor ions of interest, discovered on the basis of their giving rise to a predetermined mass loss, may be determined by comparison of their intensities to those of the same identity in one or more other samples.

In another embodiment it may be merely required to quantify a protein already identified. The protein may be in a complex mixture, and the same means for separation and recognition may be used as that already described. Here it is only necessary to recognise the relevant peptide product or products and measure their intensities in one or more samples. The basis for recognition may be that of the peptide parent or precursor ion mass or accurate mass, and that of one or more fragment, product, daughter or adduct ion masses, or accurate masses. Their retention times may also be compared thereby providing a means of confirming the recognition of the same peptide or of rejecting unmatched peptides.

The preferred embodiment is applicable to the study of proteomics. However, the same methods of identification and quantification may be used in other areas of analysis such as the study of metabolomics.

The method is appropriate for the analysis of mixtures where different components of the mixture are first separated or partially separated by a means such as chromatography that causes components to elute sequentially.

The source of ions may preferably yield mainly molecular ions or pseudo-molecular ions and relatively few (if any) fragment, product, daughter or adduct ions. Examples of such sources include atmospheric pressure ionisation sources (e.g. Electrospray and APCI) and Matrix Assisted Laser Desorption Ionisation (MALDI).

The preferred collision, fragmentation or reaction device may comprise a chamber containing gas at a sufficient density to ensure that all the ions collide with gas molecules at least once during their transit through the chamber. If the collision energy is set low by using low voltages the collisions do not induce fragmentation. If the collision energy is increased sufficiently then collisions will start to induce fragmentation. The fragmentation ions are also known as fragment, product, daughter or adduct ions. The collision, fragmentation or reaction device is preferably operated in at least two distinct operating modes—a first mode, wherein many or most of the sample or parent or precursor ions are fragmented or reacted to produce fragment, product, daughter or adduct ions and a second mode, wherein none or very few of the sample or product ions are fragmented or reacted.

If the two main operating modes are suitably set, then parent or precursor ions can be recognised by virtue of the fact that they will be relatively more intense in the mass spectrum without substantial fragmentation or reaction. Similarly, fragment, product, daughter or adduct ions can be recognised by virtue of the fact that they will be relatively more intense in the mass spectrum with substantial fragmentation or reaction.

The mass analyser may comprise a quadrupole, Time of Flight, ion trap, magnetic sector or FT-ICR mass analyser. According to a preferred embodiment the mass analyser should be capable of determining the exact or accurate mass to charge value for ions. This is to maximise selectivity for detection of characteristic fragment, product, daughter or adduct ions or mass losses, and to maximise specificity for identification of proteins.

The mass analyser preferably samples or records the whole spectrum simultaneously. This ensures that the elution times observed for all the masses are not modified or distorted by the mass analyser, and in turn would allow accurate matching of the elution times of different masses, such as parent or precursor and fragment, product, daughter or adduct ions. It also helps to ensure that the quantitative measurements are not compromised by the need to measure abundances of transient signals.

A mass filter, preferably a quadrupole mass filter, may be provided upstream of the collision, fragmentation or reaction device. The mass filter may have a highpass filter characteristic and, for example, be arranged to transmit ions having a mass to charge ratio greater than or equal to 100, 150, 200, 250, 300, 350, 400, 450 or 500. Alternatively, the mass filter may have a lowpass or bandpass filter characteristic.

An ion guide may be provided upstream of the collision, fragmentation or reaction device. The ion guide may comprise either a hexapole, quadrupole, octopole or higher order multipole rod set. In another embodiment the ion guide may comprise an ion tunnel ion guide comprising a plurality of electrodes having apertures through which ions are transmitted in use. Preferably, at least 90% of the electrodes have apertures which are substantially the same size. Alternatively, the ion guide may comprise a plurality of ring electrodes having substantially tapering internal diameters (“ion funnel”).

Parent ions that belong to a particular class of parent or precursor ions, and which are recognisable by a characteristic fragment, product, daughter or adduct ion or characteristic neutral loss are traditionally discovered by the methods of parent or precursor ion scanning or constant neutral loss scanning. Previous methods for recording parent or precursor ion scans or constant neutral loss scans involve scanning one or both quadrupoles in a triple quadrupole mass spectrometer, or scanning the quadrupole in a tandem quadrupole orthogonal TOF mass spectrometer, or scanning at least one element in other types of tandem mass spectrometers. As a consequence, these methods suffer from the low duty cycle associated with scanning instruments. As a further consequence, information may be discarded and lost whilst the mass spectrometer is occupied recording a parent or precursor ion scan or a constant neutral loss scan. As a further consequence these methods are not appropriate for use where the mass spectrometer is required to analyse substances eluting directly from gas or liquid chromatography equipment.

According to the preferred embodiment, a tandem quadrupole orthogonal Time of Flight mass spectrometer in used in a way in which parent or precursor ions of interest are discovered using a method in which sequential low and high collision energy mass spectra are recorded. The switching, altering or varying back and forth is preferably not interrupted. Instead a complete set of data is acquired, and this is then processed afterwards. Fragment, product, daughter or adduct ions may be associated with parent or precursor ions by closeness of fit of their respective elution times. In this way parent or precursor ions of interest may be confirmed or otherwise without interrupting the acquisition of data, and information need not be lost.

According to one embodiment, possible parent or precursor ions of interest may be selected on the basis of their relationship to a predetermined fragment, product, daughter or adduct ion. The predetermined fragment, product, daughter or adduct ion may comprise, for example, immonium ions from peptides, functional groups including phosphate group $PO_3^-$ ions from phosphorylated peptides or mass tags which are intended to cleave from a specific molecule or class of molecule and to be subsequently identified thus reporting the presence of the specific molecule or class of molecule. A parent or precursor ion may be short listed as a possible parent or precursor ion of interest by generating a mass chromatogram for the predetermined fragment, product, daughter or adduct ion using high fragmentation or reaction mass spectra. The centre of each peak in the mass chromatogram is then determined together with the corresponding predetermined fragment, product, daughter or adduct ion elution time(s). Then for each peak in the predetermined fragment, product, daughter or adduct ion mass chromatogram both the low fragmentation or reaction mass spectrum obtained immediately before the predetermined fragment, product, daughter or adduct ion elution time and the low fragmentation or reaction mass spectrum obtained immediately after the predetermined fragment, product, daughter or adduct ion elution time are interrogated for the presence of previously recognised parent or precursor ions. A mass chromatogram for any previously recognised parent or precursor ion found to be present in both the low fragmentation or reaction mass spectrum obtained immediately before the predetermined fragment, product, daughter or adduct ion elution time and the low fragmentation or reaction mass spectrum obtained immediately after the predetermined fragment, product, daughter or adduct ion elution time is then generated and the centre of each peak in each mass chromatogram is determined together with the corresponding possible parent or precursor ion of interest elution time(s). The possible parent or precursor ions of interest may then be ranked according to the closeness of fit of their elution time with the predetermined fragment, product, daughter or adduct ion elution time, and a list of final possible parent or precursor ions of interest may be formed by rejecting possible parent or precursor ions of interest if their elution time precedes or exceeds the predetermined fragment, product, daughter or adduct ion elution time by more than a predetermined amount.

According to an alternative embodiment, a parent or precursor ion may be shortlisted as a possible parent or precursor ion of interest on the basis of it giving rise to a predetermined mass loss. For each low fragmentation or reaction mass spectrum, a list of target fragment, product, daughter or adduct ion mass to charge values that would result from the loss of a predetermined ion or neutral particle from each previously recognised parent or precursor ion present in the low fragmentation or reaction mass spectrum is generated. Then both the high fragmentation or reaction mass spectrum obtained immediately before the low fragmentation or reaction mass spectrum and the high fragmentation or reaction mass spectrum obtained immediately after the low fragmentation or reaction mass spectrum are interrogated for the presence of fragment, product, daughter or adduct ions having a mass to charge value corresponding with a target fragment, product, daughter or adduct ion mass to charge value. A list of possible parent or precursor ions of interest (optionally including their corresponding fragment, product, daughter or adduct ions) is then formed by including in the list a parent or precursor ion if a fragment, product, daughter or adduct ion having a mass to charge value corresponding with a target fragment, product, daughter or adduct ion mass to charge value is found to be present in both the high fragmentation or reaction mass spectrum immediately before the low fragmentation or reaction mass spectrum and the high fragmentation or reaction mass spectrum immediately after the low fragmentation or reaction mass spectrum. A mass loss chromatogram may then be generated based upon possible candidate parent or precursor ions and their corresponding fragment, product, daughter or adduct ions. The centre of each peak in the mass loss chromatogram is determined together with the corresponding mass loss elution time(s). Then for each possible candidate parent or precursor ion a mass chromatogram is generated using the low fragmentation or reaction mass spectra. A corresponding fragment, product, daughter or adduct ion mass chromatogram is also generated for the corresponding fragment, product, daughter or adduct ion. The centre of each peak in the possible candidate parent or precursor ion mass chromatogram and the corresponding fragment, product, daughter or adduct ion mass chromatogram are then determined together with the corresponding possible candidate parent or precursor ion elution time(s) and corresponding fragment, product, daughter or adduct ion elution time(s). A list of final candidate parent or precursor ions may then be formed by rejecting possible candidate parent or precursor ions if the elution time of a possible candidate parent or precursor ion precedes or exceeds the corresponding fragment, product, daughter or adduct ion elution time by more than a predetermined amount.

Once a list of parent or precursor ions of interest has been formed (which preferably comprises only some of the originally recognised parent or precursor ions and possible parent or precursor ions of interest) then each parent or precursor ion of interest can then be identified.

Identification of parent or precursor ions may be achieved by making use of a combination of information. This may include the accurately determined mass or mass to charge ratio of the parent or precursor ion. It may also include the masses or mass to charge ratios of the fragment, product, daughter or adduct ions. In some instances the accurately determined masses or mass to charge ratios of the fragment, product, daughter or adduct ions may be preferred. It is known that a protein may be identified from the masses or mass to charge ratios, preferably the exact masses or mass to charge ratios, of the peptide products from proteins that have been enzymatically digested. These may be compared to those expected from a library of known proteins. It is also known that when the results of this comparison suggest more than one possible protein then the ambiguity can be resolved by analysis of the fragments of one or more of the peptides. The preferred embodiment allows a mixture of proteins, which have been enzymatically digested, to be identified in a single analysis. The masses or mass to charge ratios, or exact masses or mass to charge ratios, of all the peptides and their associated fragment, product, daughter or adduct ions may be searched against a library of known proteins. Alternatively, the peptide masses or mass to charge ratios, or exact masses or mass to charge ratios, may be searched against the library of known proteins, and where more than one protein is suggested the correct protein may be confirmed by searching for fragment, product, daughter or adduct ions which match those to be expected from the relevant peptides from each candidate protein.

The step of identifying each parent or precursor ion of interest preferably comprises recalling the elution time of the parent or precursor ion of interest, generating a list of possible fragment, product, daughter or adduct ions which comprises previously recognised fragment, product, daughter or adduct ions which are present in both the low fragmentation or reaction mass spectrum obtained immediately before the elution time of the parent or precursor ion of interest and the low fragmentation or reaction mass spectrum obtained immediately after the elution time of the parent or precursor ion of interest, generating a mass chromatogram of each possible fragment, product, daughter or adduct ion, determining the centre of each peak in each possible fragment, product, daughter or adduct ion mass chromatogram, and determining the corresponding possible fragment, product, daughter or adduct ion elution time(s). The possible fragment, product, daughter or adduct ions may then be ranked according to the closeness of fit of their elution time with the elution time of the parent or precursor ion of interest. A list of fragment, product, daughter or adduct ions may then be formed by rejecting fragment, product, daughter or adduct ions if the elution time of the fragment, product, daughter or adduct ion precedes or exceeds the elution time of the parent or precursor ion of interest by more than a predetermined amount.

The list of fragment, product, daughter or adduct ions may be yet further refined or reduced by generating a list of neighbouring parent or precursor ions which are present in the low fragmentation or reaction mass spectrum obtained nearest in time to the elution time of the final candidate parent or precursor ion. A mass chromatogram of each parent or precursor ion contained in the list is then generated and the centre of each mass chromatogram is determined along with the corresponding neighbouring parent or precursor ion elution time(s). Any fragment, product, daughter or adduct ion having an elution time which corresponds more closely with a neighbouring parent or precursor ion elution time than with the elution time of a parent or precursor ion of interest may then be rejected from the list of fragment, product, daughter or adduct ions.

Fragment, daughter, product or adduct ions may be assigned to a parent or precursor ion according to the closeness of fit of their elution times, and all fragment, product, daughter or adduct ions which have been associated with the parent or precursor ion may be listed.

An alternative embodiment which involves a greater amount of data processing but yet which is intrinsically simpler is also contemplated. Once parent and fragment, product, daughter or adduct ions have been identified, then a parent or precursor ion mass chromatogram for each recognised parent or precursor ion is generated. The centre of each peak in the parent or precursor ion mass chromatogram and the corresponding parent or precursor ion elution time(s) are then determined. Similarly, a fragment, product, daughter or adduct ion mass chromatogram for each recognised fragment, product, daughter or adduct ion is generated, and the centre of each peak in the fragment, product, daughter or adduct ion mass chromatogram and the corresponding fragment, product, daughter or adduct ion elution time(s) are then determined. Rather than then identifying only a sub-set of the recognised parent or precursor ions, all (or nearly all) of the recognised parent or precursor ions are then identified. Fragment ions are assigned to parent or precursor ions according to the closeness of fit of their respective elution times and all fragment, product, daughter or adduct ions which have been associated with a parent or precursor ion may then be listed.

Passing ions through a mass filter, preferably a quadrupole mass filter, prior to being passed to the collision, fragmentation or reaction device presents an alternative or an additional method of recognising a fragment, product, daughter or adduct ion. A fragment, product, daughter or adduct ion may be recognised by recognising ions in a high fragmentation or reaction mass spectrum which have a mass to charge ratio which is not transmitted by the collision, fragmentation or reaction device i.e. fragment, product, daughter or adduct ions are recognised by virtue of their having a mass to charge ratio falling outside of the transmission window of the mass filter. If the ions would not be transmitted by the mass filter then they must have been produced in the collision, fragmentation or reaction device.

Various embodiments of the present invention will now be described, by way of example only, and with reference to the accompanying drawings in which.

Figure 1:
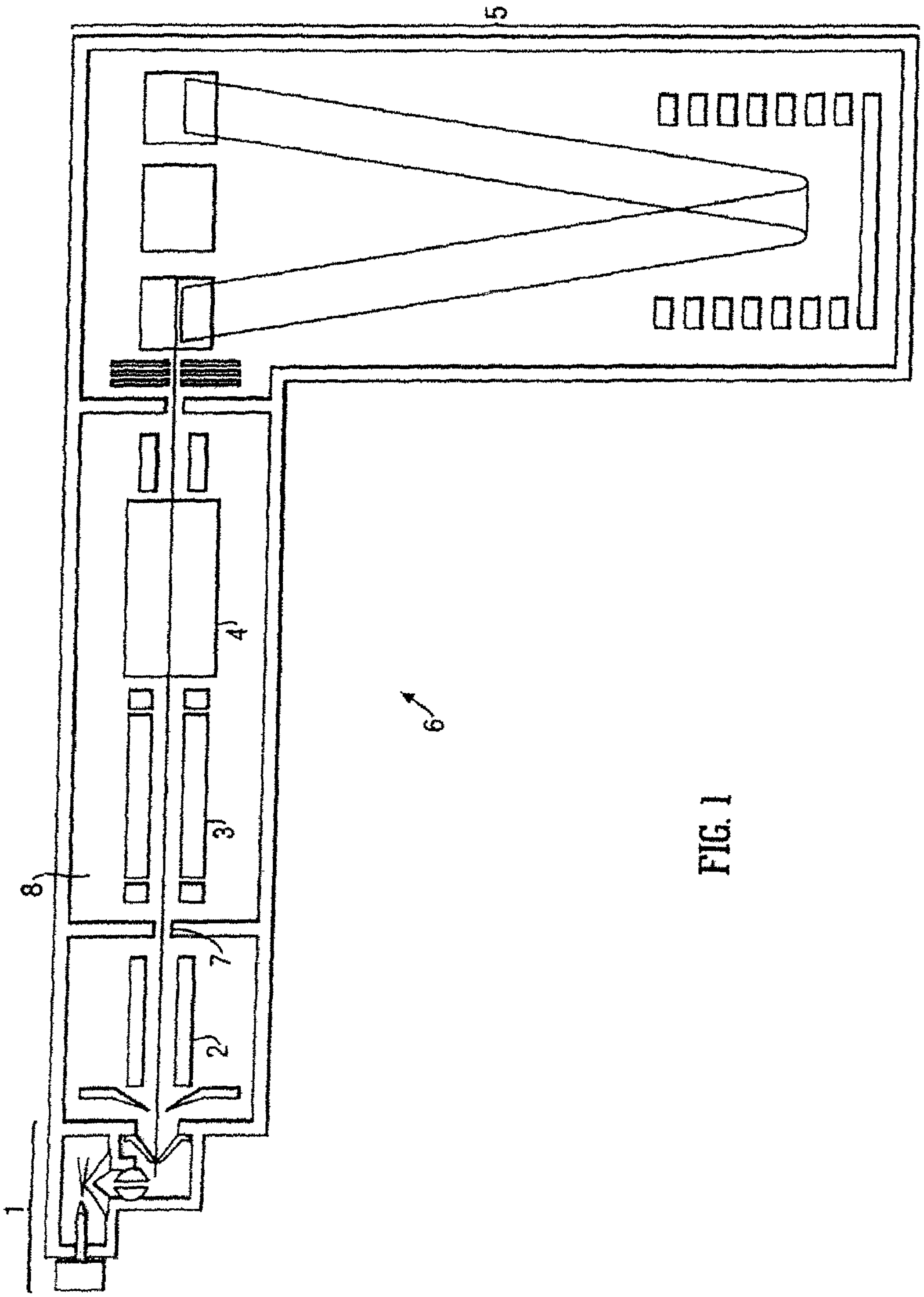
FIG. 1 is a schematic drawing of a preferred mass spectrometer.

A preferred embodiment will now be described with reference to FIG. 1. A mass spectrometer 6 is shown which comprises an ion source 1, preferably an Electrospray Ionisation source, an ion guide 2, a quadrupole mass filter 3, a collision, fragmentation or reaction device 4 and an orthogonal acceleration Time of Flight mass analyser 5 incorporating a reflectron. The ion guide 2 and mass filter 3 may be omitted if necessary. The mass spectrometer 6 is preferably interfaced with a chromatograph, such as a liquid chromatograph (not shown) so that the sample entering the ion source 1 may be taken from the eluent of the liquid chromatograph.

The quadrupole mass filter 3 is preferably disposed in an evacuated chamber which is maintained at a relatively low pressure e.g. less than $10^{B5}$ mbar. The rod electrodes comprising the mass filter 3 are connected to a power supply which generates both RF and DC potentials which determine the mass to charge value transmission window of the mass filter 3.

The collision, fragmentation or reaction device 4 may comprise a Surface Induced Dissociation ("SID") collision, fragmentation or reaction device, an Electron Transfer Dissociation collision, fragmentation or reaction device, an Electron Capture Dissociation collision, fragmentation or reaction device, an Electron Collision or Impact Dissociation collision, fragmentation or reaction device, a Photo Induced Dissociation ("PID") collision, fragmentation or reaction device, a Laser Induced Dissociation collision, fragmentation or reaction device, an infrared radiation induced dissociation device, an ultraviolet radiation induced dissociation device, a thermal or temperature source collision, fragmentation or reaction device, an electric field induced collision, fragmentation or reaction device, a magnetic field induced collision, fragmentation or reaction device, an enzyme digestion or enzyme degradation collision, fragmentation or reaction device, an ion-ion reaction collision, fragmentation or reaction device, an ion-molecule reaction collision, fragmentation or reaction device, an ion-atom reaction collision, fragmentation or reaction device, an ion-metastable ion reaction collision, fragmentation or reaction device, an ion-metastable molecule reaction collision, fragmentation or reaction device, an ion-metastable atom reaction collision, fragmentation or reaction device, an ion-ion reaction device for reacting ions to form adduct or product ions, an ion-molecule reaction device for reacting ions to form adduct or product ions, an ion-atom reaction device for reacting ions to form adduct or product ions, an ion-metastable ion reaction device for reacting ions to form adduct or product ions, an ion-metastable molecule reaction device for reacting ions to form adduct or product ions or an ion-metastable atom reaction device for reacting ions to form adduct or product ions.

Alternatively, the collision, fragmentation or reaction device may form part of the ion source. For example, the collision, fragmentation or reaction device may comprise a nozzle-skimmer interface collision, fragmentation or reaction device, an in-source collision, fragmentation or reaction device or an ion-source Collision Induced Dissociation collision, fragmentation or reaction device.

In an arrangement the collision, fragmentation or reaction device 4 may comprise either a quadrupole or hexapole rod set which may be enclosed in a substantially gas-tight casing (other than having a small ion entrance and exit orifice) into which a gas such as helium, argon, nitrogen, air or methane may be introduced at a pressure of between $10^{-4}$ and $10^{-1}$ mbar, further preferably $10^{-3}$ mbar to $10^{-2}$ mbar. Suitable AC or RF potentials for the electrodes comprising the collision, fragmentation or reaction device 4 are provided by a power supply (not shown).

Ions generated by the ion source 1 are transmitted by ion guide 2 and pass via an interchamber orifice 7 into vacuum chamber 8. Ion guide 2 is maintained at a pressure intermediate that of the ion source and the vacuum chamber 8. In the embodiment shown, ions are mass filtered by mass filter 3 before entering the preferred collision, fragmentation or reaction device 4. However, the mass filter 3 is an optional feature of this embodiment. Ions exiting from the collision, fragmentation or reaction device 4 or which have been transmitted through the collision, fragmentation or reaction device 4 preferably pass to a mass analyser which preferably comprises a Time of Flight mass analyser 5. Other ion optical components, such as further ion guides and/or electrostatic lenses, may be provided which are not shown in the figures or described herein. Such components may be used to maximise ion transmission between various parts or stages of the apparatus. Various vacuum pumps (not shown) may be provided for maintaining optimal vacuum conditions. The Time of Flight mass analyser 5 incorporating a reflectron operates in a known way by measuring the transit time of the ions comprised in a packet of ions so that their mass to charge ratios can be determined.

A control means (not shown) provides control signals for the various power supplies (not shown) which respectively provide the necessary operating potentials for the ion source 1, ion guide 2, quadrupole mass filter 3, collision, fragmentation or reaction device 4 and the Time of Flight mass analyser 5. These control signals determine the operating parameters of the instrument, for example the mass to charge ratios transmitted through the mass filter 3 and the operation of the analyser 5. The control means may be a computer (not shown) which may also be used to process the mass spectral data acquired. The computer can also display and store mass spectra produced by the analyser 5 and receive and process commands from an operator. The control means may be automatically set to perform various methods and make various determinations without operator intervention, or may optionally require operator input at various stages.

The control means is also preferably arranged to switch, alter or vary the collision, fragmentation or reaction device 4 back and forth repeatedly and/or regularly between at least two different modes. In one mode a relatively high voltage such as greater than or equal to 15V may be applied to the collision, fragmentation or reaction device 4 which in combination with the effect of various other ion optical devices upstream of the collision, fragmentation or reaction device 4 may be sufficient to cause a fair degree of fragmentation or reaction of ions passing therethrough. In a second mode a relatively low voltage such as less than or equal to 5V may be applied which may cause relatively little (if any) significant fragmentation or reaction of ions passing therethrough.

In one embodiment the control means may switch, alter or vary between modes approximately every second. When the mass spectrometer 6 is used in conjunction with an ion source 1 being provided with an eluent separated from a mixture by means of liquid or gas chromatography, the mass spectrometer 6 may be run for several tens of minutes over which period of time several hundred high and low fragmentation or reaction mass spectra may be obtained.

At the end of the experimental run the data which has been obtained is preferably analysed and parent or precursor ions and fragment, product, daughter or adduct ions can be recognised on the basis of the relative intensity of a peak in a mass spectrum obtained when the collision, fragmentation or reaction device 4 was in one mode compared with the intensity of the same peak in a mass spectrum obtained approximately a second later in time when the collision, fragmentation or reaction device 4 was in the second mode.

According to an embodiment, mass chromatograms for each parent and fragment, product, daughter or adduct ion are generated and fragment, product, daughter or adduct ions are assigned to parent or precursor ions on the basis of their relative elution times.

An advantage of this method is that since all the data is acquired and subsequently processed then all fragment, product, daughter or adduct ions may be associated with a parent or precursor ion by closeness of fit of their respective elution times. This allows all the parent or precursor ions to be identified from their fragment, product, daughter or adduct ions, irrespective of whether or not they have been discovered by the presence of a characteristic fragment, product, daughter or adduct ion or characteristic "neutral loss".

According to another embodiment an attempt is made to reduce the number of parent or precursor ions of interest. A list of possible (i.e. not yet finalised) parent or precursor ions of interest may be formed by looking for parent or precursor ions which may have given rise to a predetermined fragment, product, daughter or adduct ion of interest e.g. an immonium ion from a peptide. Alternatively, a search may be made for parent and fragment, product, daughter or adduct ions wherein the parent or precursor ion could have fragmented or reacted into a first component comprising a predetermined ion or neutral particle and a second component comprising a fragment, product, daughter or adduct ion. Various steps may then be taken to further reduce/refine the list of possible parent or precursor ions of interest to leave a number of parent or precursor ions of interest which are then preferably subsequently identified by comparing elution times of the parent or precursor ions of interest and fragment, product, daughter or adduct ions. As will be appreciated, two ions could have similar mass to charge ratios but different chemical structures and hence would most likely fragment differently enabling a parent or precursor ion to be identified on the basis of a fragment, product, daughter or adduct ion.

Figure 2:
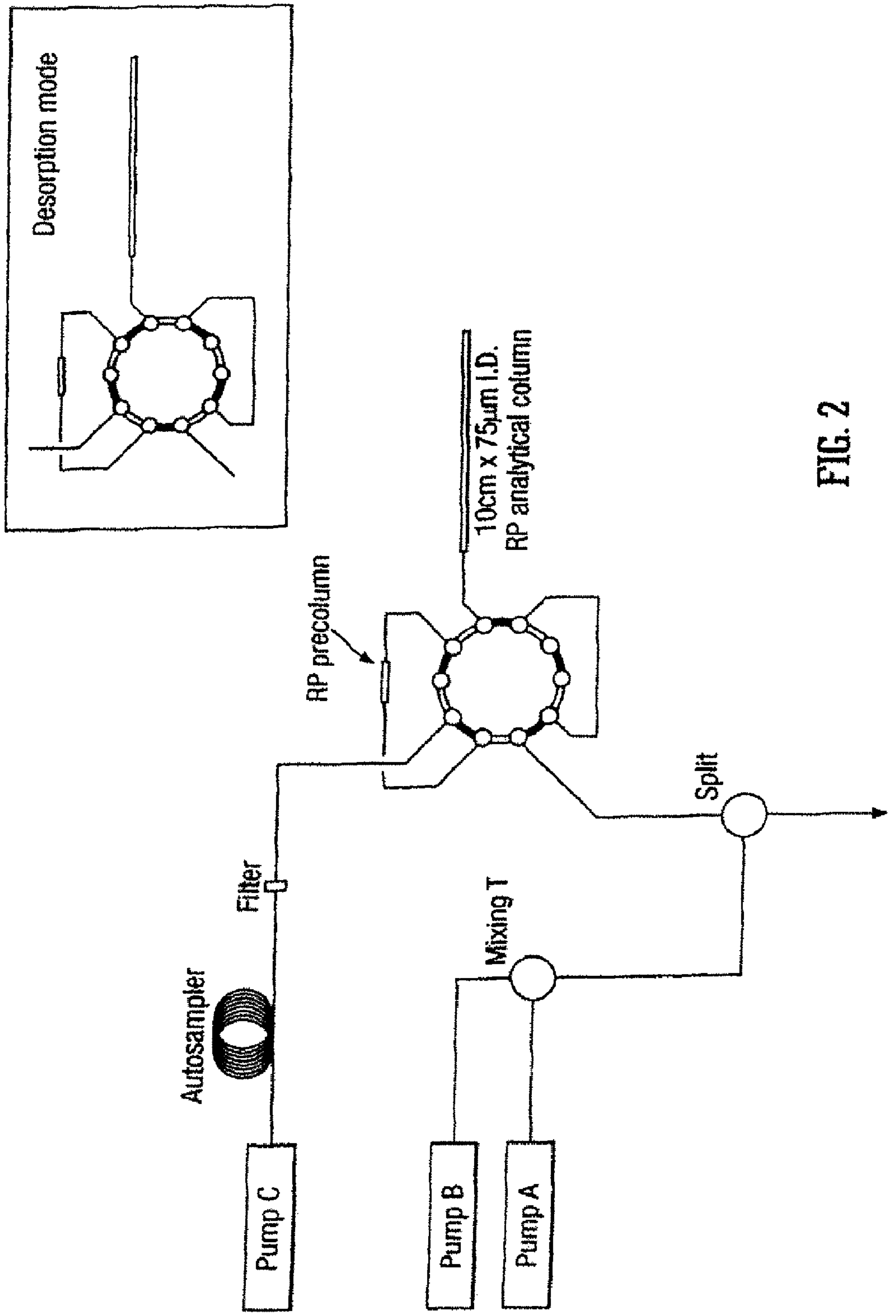
FIG. 2 shows a schematic of a valve switching arrangement during sample loading and desalting and the inset shows desorption of a sample from an analytical column.

A sample introduction system is shown in more detail in FIG. 2. Samples may be introduced into the mass spectrometer 6 by means of a Micromass® modular CapLC system. For example, samples may be loaded onto a C18 cartridge (0.3 mm×5 mm) and desalted with 0.1% HCOOH for 3 minutes at a flow rate of 30 μL per minute. A ten port valve may then switched such that the peptides are eluted onto the analytical column for separation, see inset of FIG. 2. Flow from two pumps A and B may be split to produce a flow rate through the column of approximately 200 nl/min.

A preferred analytical column is a PicoFrit® column packed with Waters® Symmetry C18 set up to spray directly into the mass spectrometer 6. An Electrospray potential (ca. 3 kV) may be applied to the liquid via a low dead volume stainless steel union. A small amount e.g. 5 psi (34.48 kPa) of nebulising gas may be introduced around the spray tip to aid the Electrospray process.

Data can be acquired using a mass spectrometer 6 fitted with a Z-spray® nanoflow Electrospray ion source. The mass spectrometer may be operated in the positive ion mode with a source temperature of 80° C. and a cone gas flow rate of 401/hr.

The instrument may be calibrated with a multi-point calibration using selected fragment, product, daughter or adduct ions that result, for example, from the Collision Induced Decomposition (CID) of Glu-fibrinopeptide b. Data may be processed using the MassLynx® suite of software.

Figure 3A:
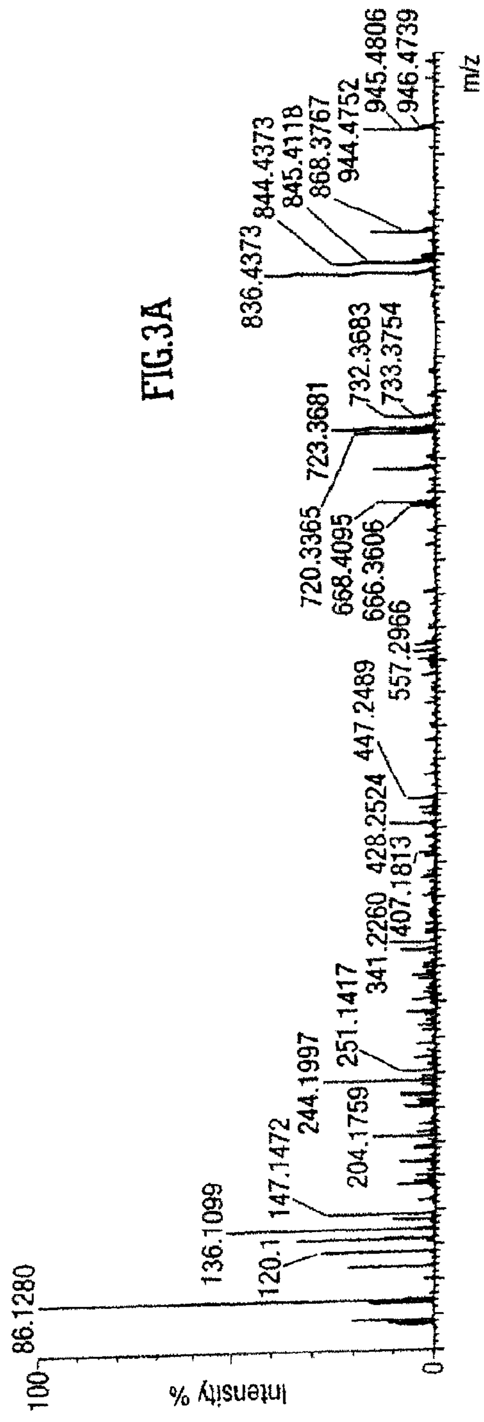
FIG. 3A shows a fragment or daughter ion mass spectrum and FIG. 3B shows the corresponding parent or precursor ion mass spectrum obtained when a mass filter upstream of a collision cell was arranged so as to transmit ions having a mass to charge ratio>350 to the collision cell.
Figure 3B:
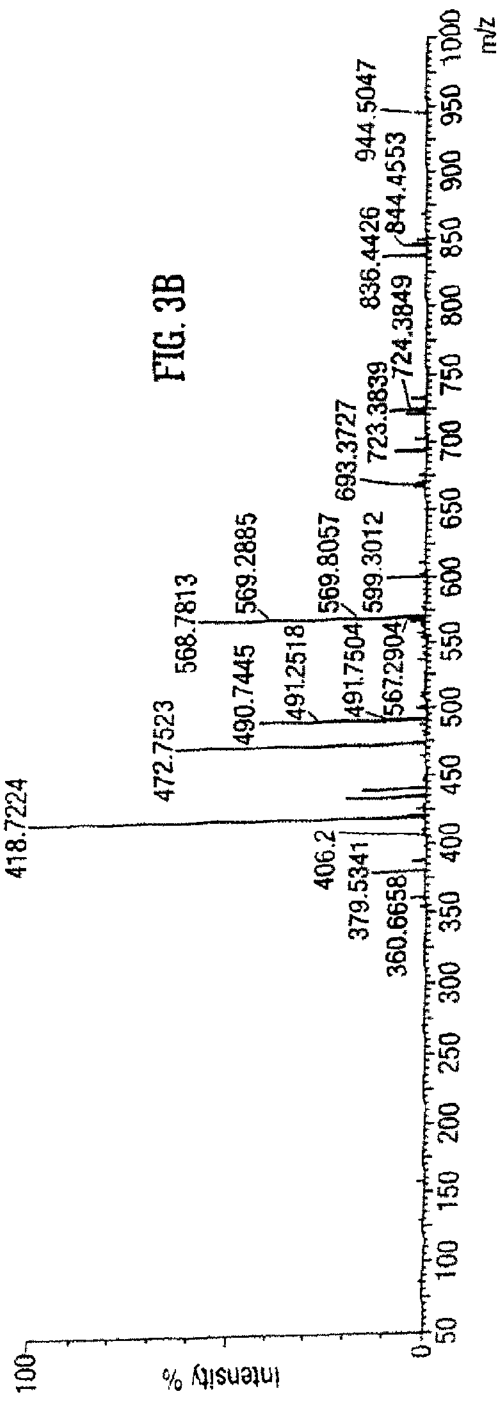
Figure 4A:
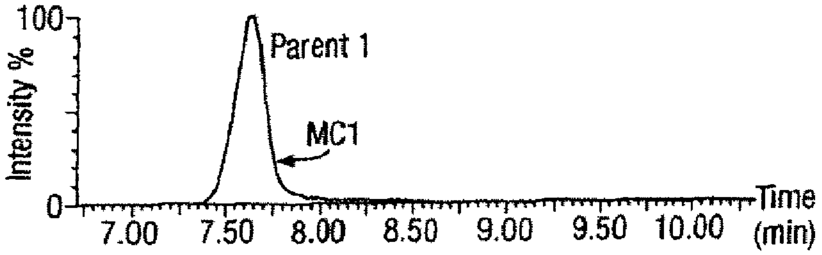
FIG. 4A shows a mass chromatogram of a parent or precursor ion.
Figure 4B:
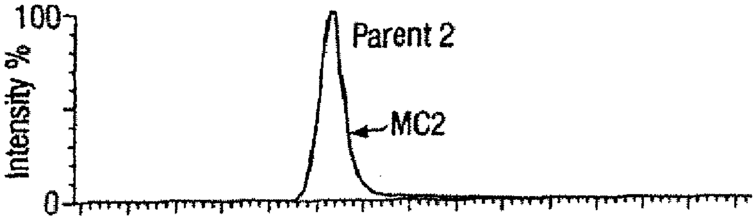
FIG. 4B shows a mass chromatogram of a parent or precursor ion.
Figure 4C:
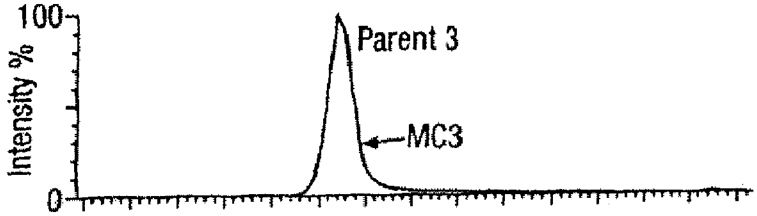
FIG. 4C shows a mass chromatogram of a parent or precursor ion.
Figure 4D:
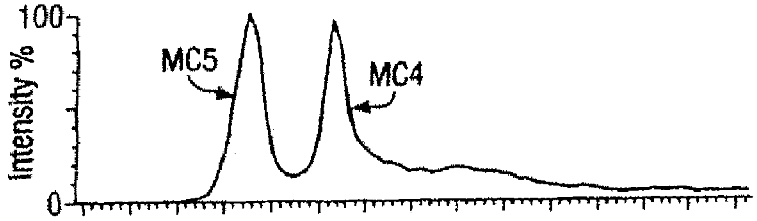
FIG. 4D shows a mass chromatogram of a fragment or daughter ion and FIG. 4E shows a mass chromatogram of a fragment or daughter.
Figure 4E:
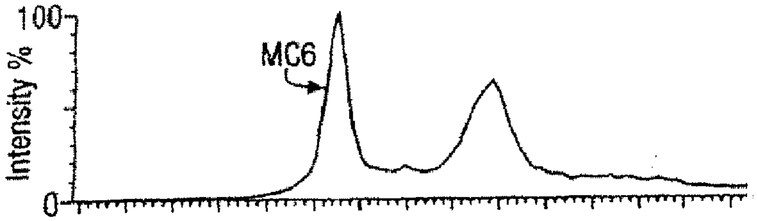

FIGS. 3A and 3B show respectively fragment or daughter and parent or precursor ion spectra of a tryptic digest of alcohol dehydrogenase (ADH). The fragment or daughter ion spectrum shown in FIG. 3A was obtained while the collision cell voltage was high, e.g. around 30V, which resulted in significant fragmentation of ions passing therethrough. The parent or precursor ion spectrum shown in FIG. 3B was obtained at low collision energy e.g. less than or equal to 5V. The data presented in FIG. 3B was obtained using a mass filter 3 upstream of the collision cell and set to transmit ions having a mass to charge value greater than 350. The mass spectra in this particular example were obtained from a sample eluting from a liquid chromatograph, and the spectra were obtained sufficiently rapidly and close together in time that they essentially correspond to the same component or components eluting from the liquid chromatograph.

In FIG. 3B, there are several high intensity peaks in the parent or precursor ion spectrum, e.g. the peaks at 418.7724 and 568.7813, which are substantially less intense in the corresponding fragment or daughter ion spectrum shown in FIG. 3A. These peaks may therefore be recognised as being parent or precursor ions. Likewise, ions which are more intense in the fragment or daughter ion spectrum shown in FIG. 3A than in the parent or precursor ion spectrum shown in FIG. 3B may be recognised as being fragment or daughter ions. As will also be apparent, all the ions having a mass to charge value less than 350 in the high fragmentation mass spectrum shown in FIG. 3A can be readily recognised as being fragment or daughter ions on the basis that they have a mass to charge value less than 350 and the fact that only parent or precursor ions having a mass to charge value greater than 350 were transmitted by the mass filter 5 to the collision cell.

FIGS. 4A-E show respectively mass chromatograms for three parent or precursor ions and two fragment or daughter ions. The parent or precursor ions were determined to have mass to charge ratios of 406.2 (peak "MC1"), 418.7 (peak "MC2") and 568.8 (peak "MC3") and the two fragment or daughter ions were determined to have mass to charge ratios of 136.1 (peaks "MC4" and "MC5") and 120.1 (peak "MC6").

It can be seen that parent or precursor ion peak MC1 (mass to charge ratio 406.2) correlates well with fragment or daughter ion peak MC5 (mass to charge ratio 136.1) i.e. a parent or precursor ion with a mass to charge ratio of 406.2 seems to have fragmented to produce a fragment or daughter ion with a mass to charge ratio of 136.1. Similarly, parent or precursor ion peaks MC2 and MC3 correlate well with fragment or daughter ion peaks MC4 and MC6, but it is difficult to determine which parent or precursor ion corresponds with which fragment or daughter ion.

Figure 5:
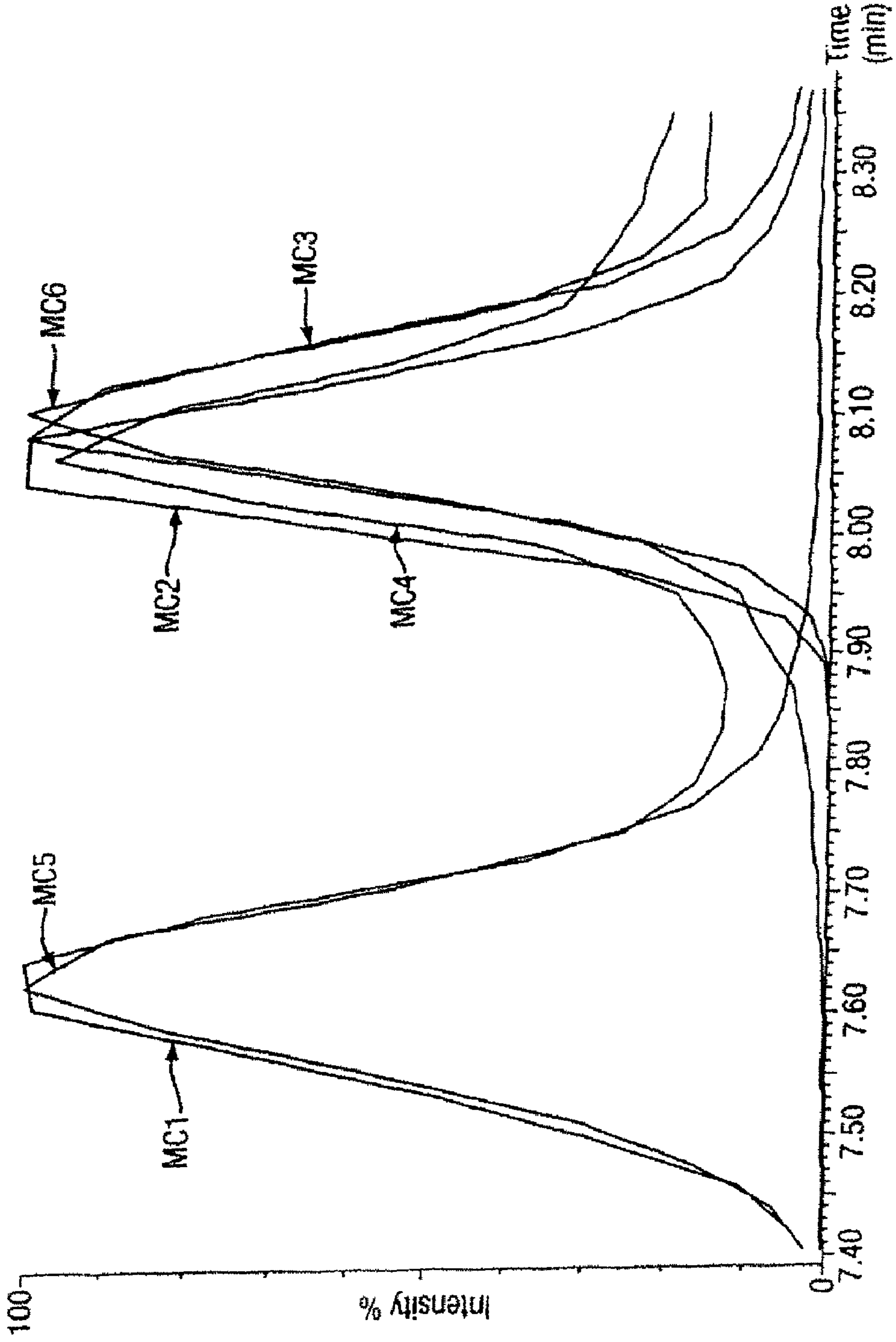
FIG. 5 shows the mass chromatograms of FIGS. 4A-E superimposed upon one another.

FIG. 5 shows the peaks of FIGS. 4-E overlaid on top of one other and redrawn at a different scale. By careful comparison of the peaks of MC2, MC3, MC4 and MC6 it can be seen that in fact parent or precursor ion MC2 and fragment or daughter ion MC4 correlate well whereas parent or precursor ion MC3 correlates well with fragment or daughter ion MC6. This suggests that parent or precursor ions with a mass to charge ratio of 418.7 fragmented to produce fragment or daughter ions with a mass to charge ratio of 136.1 and that parent or precursor ions with mass to charge ratio 568.8 fragmented to produce fragment or daughter ions with a mass to charge ratio of 120.1.

This cross-correlation of mass chromatograms may be carried out using automatic peak comparison means such as a suitable peak comparison software program running on a suitable computer.

Figure 6:
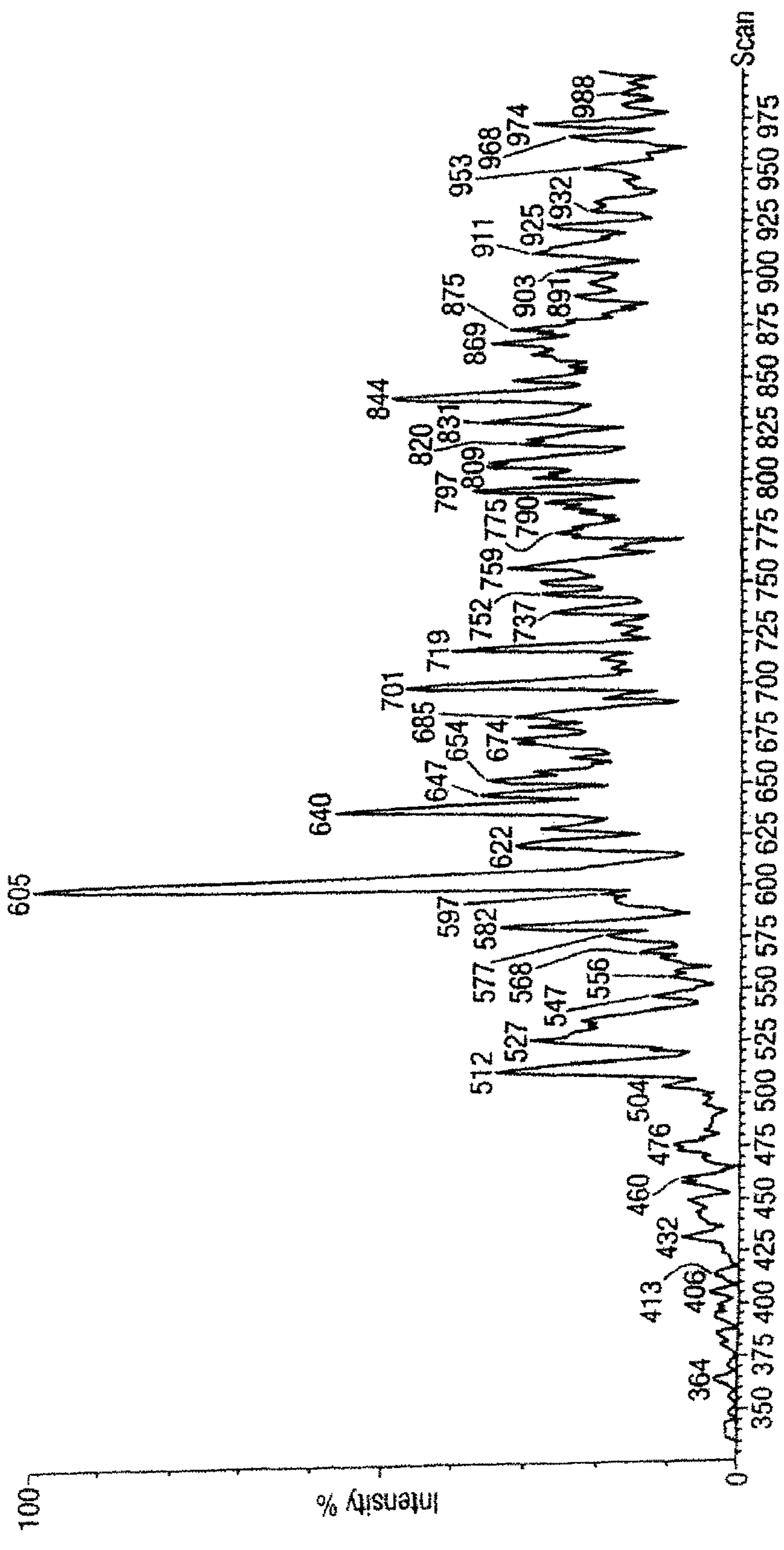
FIG. 6 shows a mass chromatogram of the Asparagine immonium ion which has a mass to charge ratio of 87.04.
Figure 7:
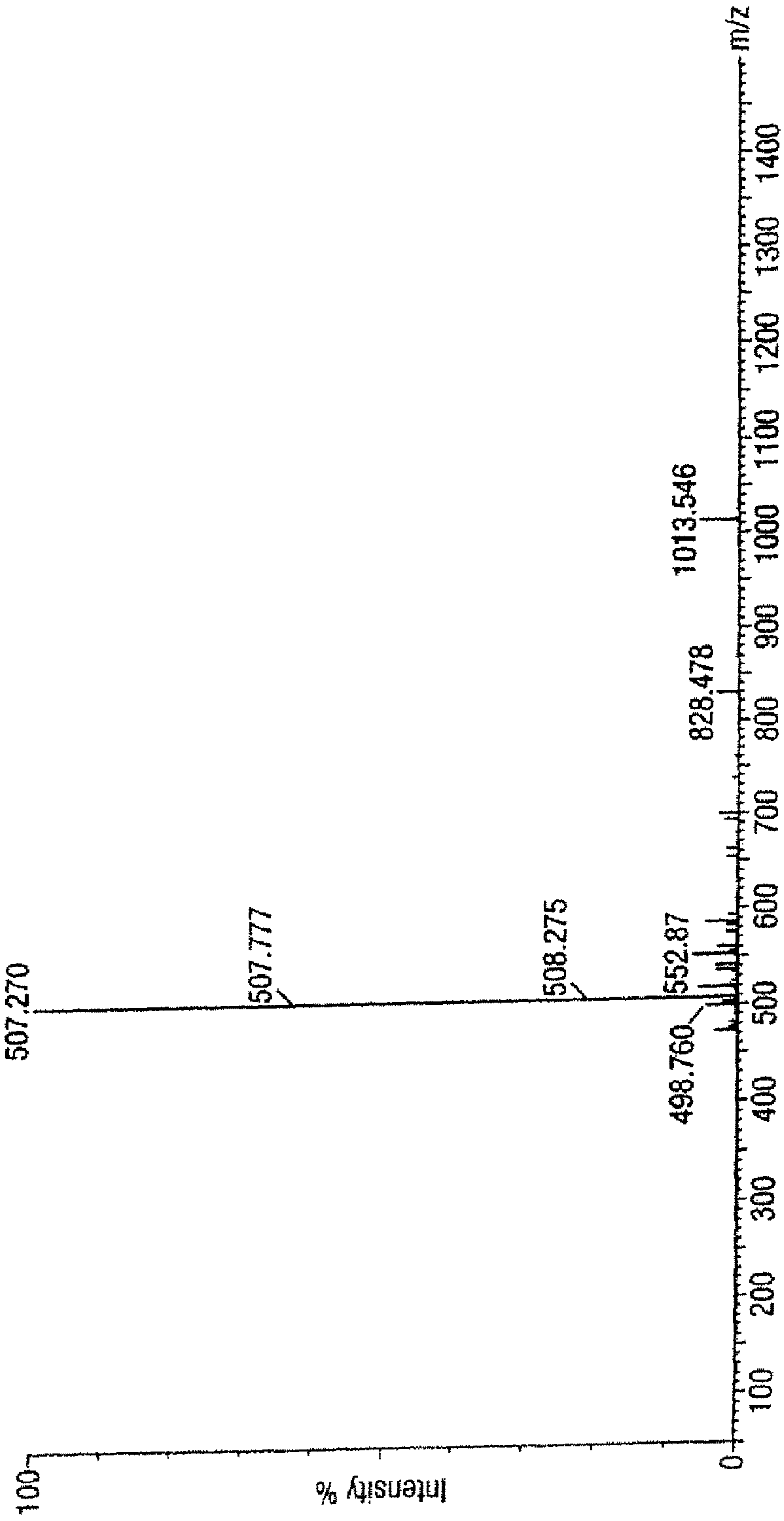
FIG. 7 shows a mass spectrum of the peptide ion T5 derived from ADH which has the sequence ANELLINVK and a molecular weight of 1012.59.

FIG. 6 show the mass chromatogram for the fragment or daughter ion having a mass to charge ratio of 87.04 extracted from a HPLC separation and mass analysis obtained using mass spectrometer 6. It is known that the immonium ion for the amino acid Asparagine has a mass to charge value of 87.04. This chromatogram was extracted from all the high energy spectra recorded on the mass spectrometer 6. FIG. 7 shows the full mass spectrum corresponding to scan number 604. This was a low energy mass spectrum recorded on the mass spectrometer 6, and is the low energy spectrum next to the high energy spectrum at scan 605 that corresponds to the largest peak in the mass chromatogram of mass to charge ratio 87.04. This shows that the parent or precursor ion for the Asparagine immonium ion at mass to charge ratio 87.04 has a mass of 1012.54 since it shows the singly charged $(M+H)^+$ ion at mass to charge ratio 1013.54, and the doubly charged $(M+2H)^{++}$ ion at mass to charge ratio 507.27.

Figure 8:
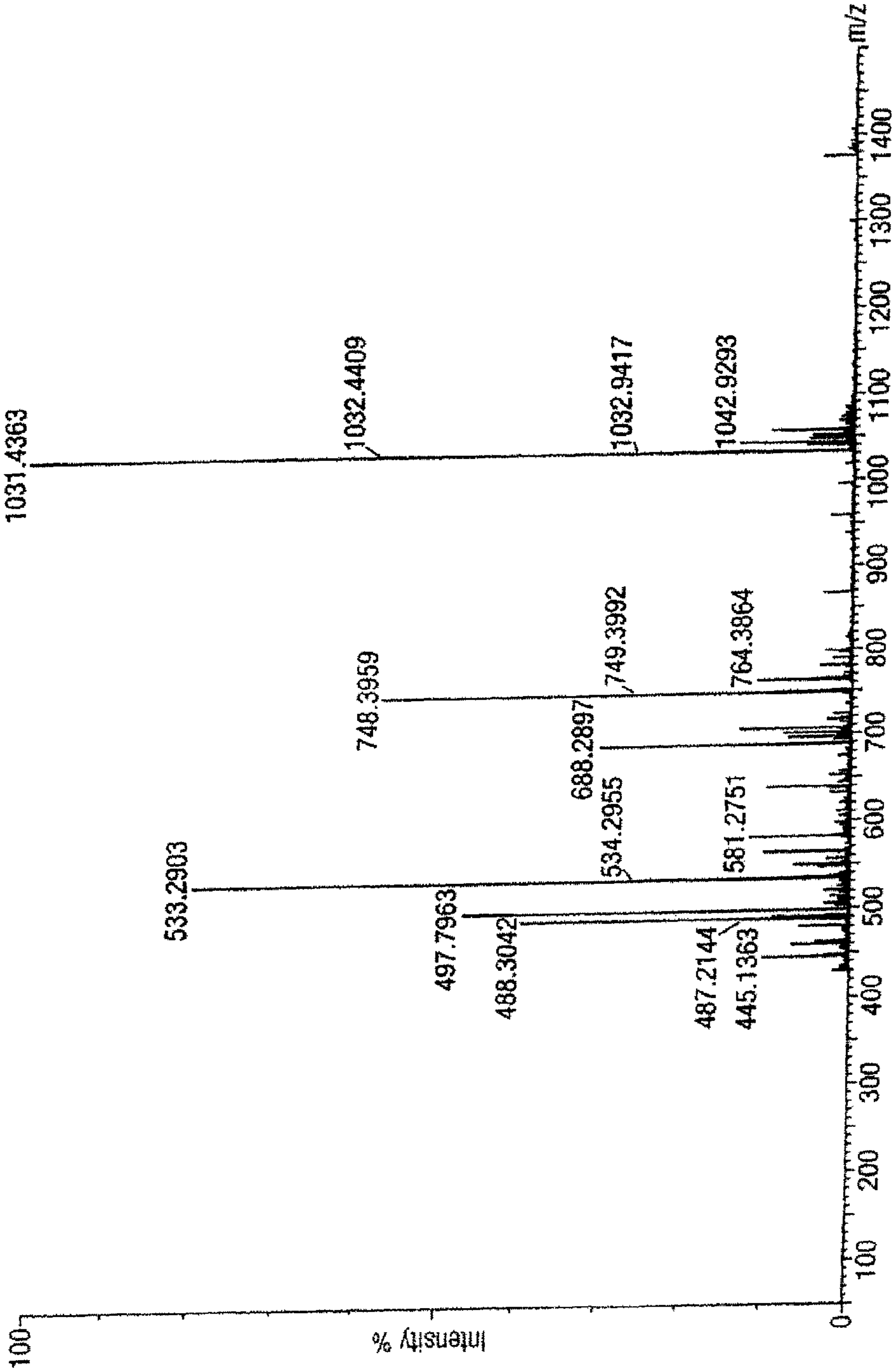
FIG. 8 shows a mass spectrum of a tryptic digest of β-Casein obtained when a collision cell was in a low fragmentation mode.
Figure 9:
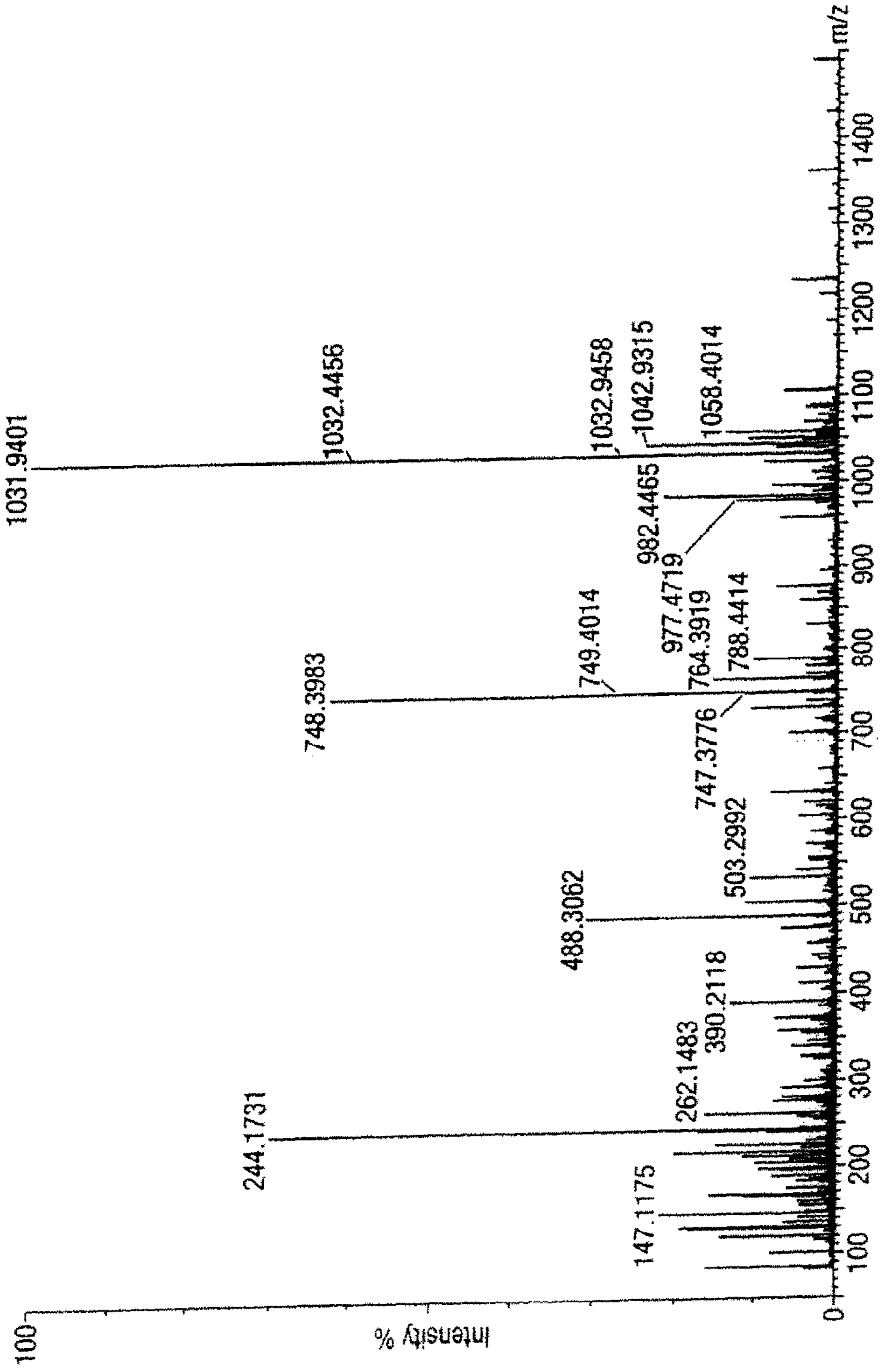
FIG. 9 shows a mass spectrum of a tryptic digest of β-Casein obtained when a collision cell was in a high fragmentation mode.
Figure 10:
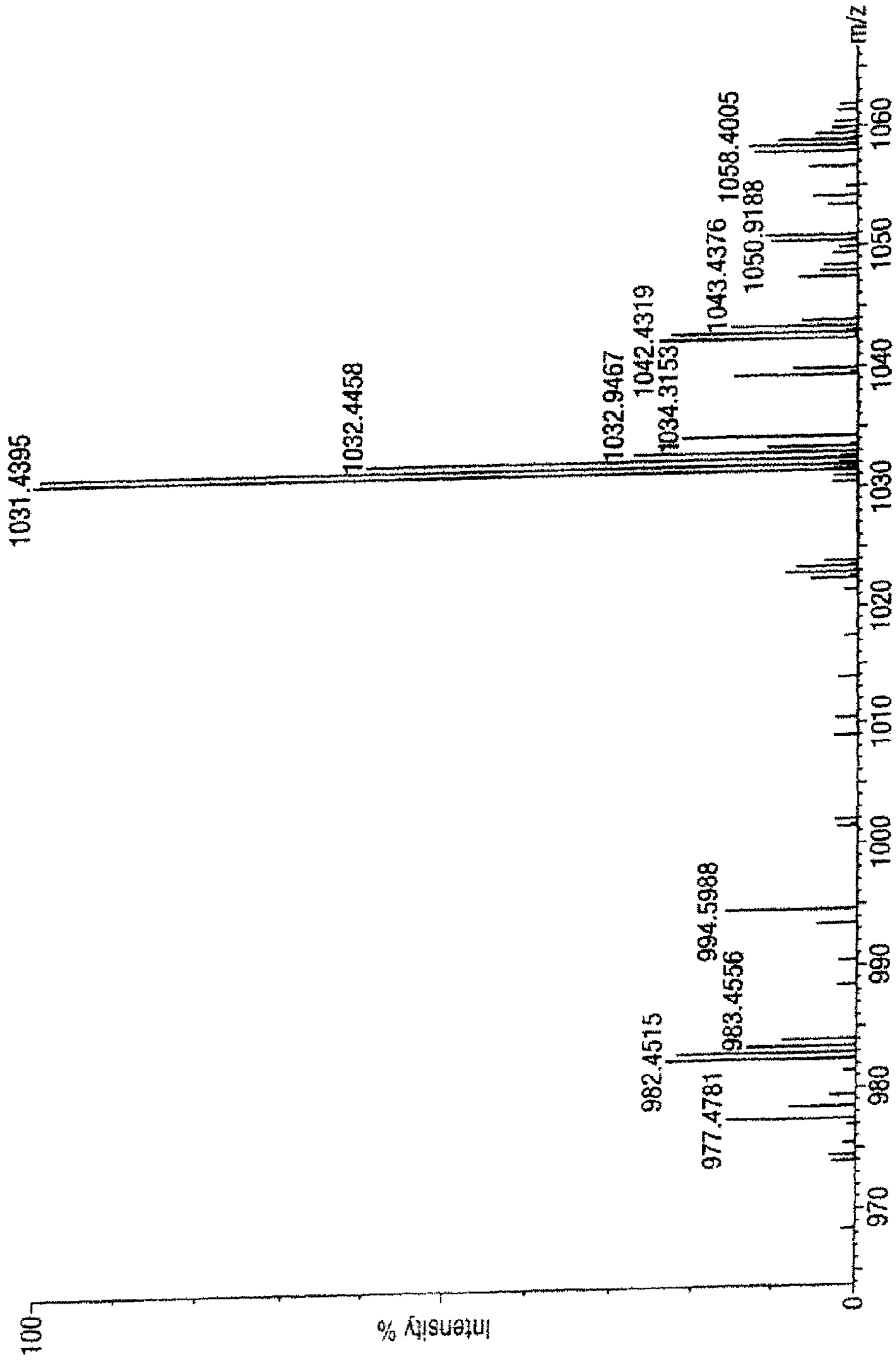
FIG. 10 shows a processed and expanded view of the mass spectrum shown in FIG. 9.

FIG. 8 shows a mass spectrum from a low energy spectra recorded on a mass spectrometer 6 of a tryptic digest of the protein β-Casein. The protein digest products were separated by HPLC and mass analysed. The mass spectra were recorded on a mass spectrometer 6 operating in a MS mode and alternating between low and high collision energy in a gas collision cell for successive spectra. FIG. 9 shows a mass spectrum from the high energy spectra recorded at substantially the same time that the low energy mass spectrum shown in FIG. 8 relates to. FIG. 10 shows a processed and expanded view of the mass spectrum shown in FIG. 9 above. For this spectrum, the continuum data has been processed so as to identify peaks and display them as lines with heights proportional to the peak area, and annotated with masses corresponding to their centroided masses. The peak at mass to charge ratio 1031.4395 is the doubly charged $(M+2H)^{++}$ ion of a peptide, and the peak at mass to charge ratio 982.4515 is a doubly charged fragment or daughter ion. It has to be a fragment or daughter ion since it is not present in the low energy spectrum. The mass difference between these ions is 48.9880. The theoretical mass for $H_3PO_4$ is 97.9769, and the mass to charge value for the doubly charged $H_3PO_4^{++}$ ion is 48.9884, a difference of only 8 ppm from that observed. It is therefore assumed that the peak having a mass to charge ratio of 982.4515 relates to a fragment or daughter ion resulting from a peptide ion having a mass to charge of 1031.4395 losing a $H_3PO_4^{++}$ ion.

Some experimental data is now presented which illustrates the ability of the preferred embodiment to quantify the relative abundance of two proteins contained in two different samples which comprise a mixture of proteins.

A first sample contained the tryptic digest products of three proteins BSA, Glycogen Phosphorylase B and Casein. These three proteins were initially present in the ratio 1:1:1. Each of the three proteins had a concentration of 330 fmol/μl. A second sample contained the tryptic digest products of the same three proteins BSA, Glycogen Phosphorylase B and Casein. However, the proteins were initially present in the ratio 1:1:X. X was uncertain but believed to be in the range 2-3. The concentration of the proteins BSA and Glycogen Phosphorylase B in the second sample mixture was the same as in the first sample, namely 330 fmol/μl.

The experimental protocol which was followed was that 1 μl of sample was loaded for separation on to a HPLC column at a flow rate of 4 μl/min. The liquid flow was then split such that the flow rate to the nano-electrospray ionisation source was approximately 200 nl/min.

Mass spectra were recorded on the mass spectrometer 6. Mass spectra were recorded at alternating low and high collision energy using nitrogen collision gas. The low-collision energy mass spectra were recorded at a collision voltage of 10V and the high-collision energy mass spectra were recorded at a collision voltage of 33V. The mass spectrometer was fitted with a Nano-Lock-Spray device which delivered a separate liquid flow to the source which may be occasionally sampled to provide a reference mass from which the mass calibration may be periodically validated. This ensured that the mass measurements were accurate to within an RMS accuracy of 5 ppm. Data were recorded and processed using the MassLynx® data system.

The first sample was initially analysed and the data was used as a reference. The first sample was then analysed a further two times. The second sample was analysed twice. The data from these analyses were used to attempt to quantify the (unknown) relative abundance of Casein in the second sample.

All data files were processed automatically generating a list of ions with associated areas and high-collision energy spectra for each experiment. This list was then searched against the Swiss-Prot protein database using the ProteinLynx® search engine. Chromatographic peak areas were obtained using the Waters® Apex Peak Tracking algorithm. Chromatograms for each charge state found to be present were summed prior to integration.

The experimentally determined relative expression level of various peptide ions normalised with respect to the reference data for the two samples are given in the following tables.

| BSA peptide ions | Sample 1 Run 1 | Sample 1 Run 2 | Sample 2 Run 1 | Sample 2 Run 2 |
|---|---|---|---|---|
| FKDLGEEHFK | 0.652 | 0.433 | 0.914 | 0.661 |
| HLVDEPQNLIK | 0.905 | 0.829 | 0.641 | 0.519 |
| KVPQVSTPTLVEVSR | 1.162 | 0.787 | 0.629 | 0.635 |
| LVNELTEFAK | 1.049 | 0.795 | 0.705 | 0.813 |
| LGEYGFQNALIVR | 1.278 | 0.818 | 0.753 | 0.753 |
| AEFVEVTK | 1.120 | 0.821 | 0.834 | 0.711 |
| Average | 1.028 | 0.747 | 0.746 | 0.682 |

| Glycogen Phophorylase B peptide ions | Sample 1 Run 1 | Sample 1 Run 2 | Sample 2 Run 1 | Sample 2 Run 2 |
|---|---|---|---|---|
| VLVDLER | 1.279 | 0.751 | n/a | 0.701 |
| TNFDAFPDK | 0.798 | 0.972 | 0.691 | 0.699 |
| EIWGVEPSR | 0.734 | 0.984 | 1.053 | 1.054 |
| LITAIGDVVNHDPVVGDR | 1.043 | 0.704 | 0.833 | 0.833 |
| VLPNDNFFEGK | 0.969 | 0.864 | 0.933 | 0.808 |

-continued

| Glycogen Phophorylase B peptide ions | Sample 1 Run 1 | Sample 1 Run 2 | Sample 2 Run 1 | Sample 2 Run 2 |
|---|---|---|---|---|
| QIIEQLSSGFFSPK | 0.691 | n/a | 1.428 | 1.428 |
| VAAAFPGDVDR | 1.140 | 0.739 | 0.631 | 0.641 |
| Average | 0.951 | 0.836 | 0.928 | 0.881 |

| CASEIN Peptide sequence | Sample 1 Run 1 | Sample 1 Run 2 | Sample 2 Run 1 | Sample 2 Run 2 |
|---|---|---|---|---|
| EDVPSER | 0.962 | 0.941 | 2.198 | 1.962 |
| HQGLPQEVLNENLLR | 0.828 | 0.701 | 1.736 | 2.090 |
| FFVAPFPEVFGK | 1.231 | 0.849 | 2.175 | 1.596 |
| Average | 1.007 | 0.830 | 2.036 | 1.883 |

Peptides whose sequences were confirmed by high-collision energy data are underlined in the above tables. Confirmation means that the probability of this peptide, given its accurate mass and the corresponding high-collision energy data, is larger than that of any other peptide in the database given the current fragmentation or reaction model. The remaining peptides are believed to be correct based on their retention time and mass compared to those for confirmed peptides. It was expected that there would be some experimental error in the results due to injection volume errors and other effects.

When using BSA as an internal reference, the relative abundance of Glycogen Phosphorylase B in the first sample was determined to be 0.925 (first analysis) and 1.119 (second analysis) giving an average of 1.0. The relative abundance of Glycogen Phosphorylase B in the second sample was determined to be 1.244 (first analysis) and 1.292 (second analysis) giving an average of 1.3. These results compare favourably with the expected value of 1.

Similarly, the relative abundance of Casein in the first sample was determined to be 0.980 (first analysis) and 1.111 (second analysis) giving an average of 1.0. The relative abundance of Casein in the second sample was determined to be 2.729 (first analysis) and 2.761 (second analysis) giving an average of 2.7. These results compare favourably with the expected values of 1 and 2-3.

The following data relates to chromatograms and mass spectra obtained from the first and second samples. One peptide having the sequence HQGLPQEVLNENLLR and derived from Casein elutes at almost exactly the same time as the peptide having the sequence LVNELTEFAK derived from BSA. Although this is an unusual occurrence, it provided an opportunity to compare the abundance of Casein in the two different samples.

Figure 11:
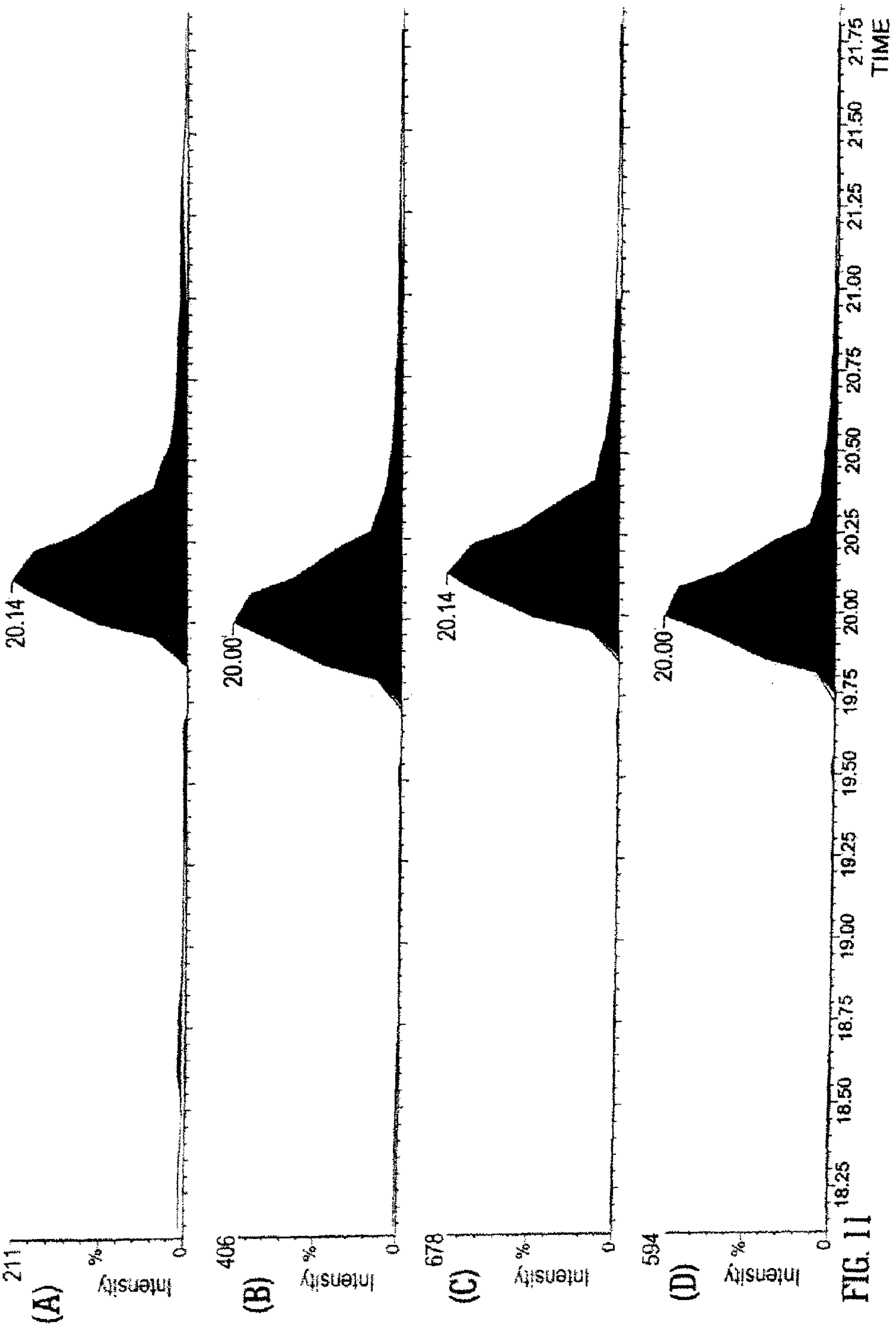
FIG. 11A shows a mass chromatogram of an ion from a first sample having a mass to charge ratio of 880.4.
FIG. 11B shows a similar mass chromatogram of the same ion from a second sample.
FIG. 11C shows a mass chromatogram of an ion from a first sample having a mass to charge ratio of 582.3
FIG. 11D shows a similar mass chromatogram of the same ion from a second sample.

FIGS. 11A-D show four mass chromatograms, two relating to the first sample and two relating to the second sample. FIG. 11A shows a mass chromatogram relating to the first sample for ions having a mass to charge ratio of 880.4 which corresponds with the peptide ion $(M+2H)^{++}$ having the sequence HQGLPQEVLNENLLR and which is derived from Casein. FIG. 11B shows a mass chromatogram relating to the second sample which corresponds with the same peptide ion having the sequence HQGLPQEVLNENLLR which is derived from Casein.

FIG. 11C shows a mass chromatogram relating to the first sample for ions having a mass to charge ratio of 582.3 which corresponds with the peptide ion $(M+2H)^{++}$ having the sequence LVNELTEFAK and which is derived from BSA. FIG. 11D shows a mass chromatogram relating to the second sample which corresponds with the same peptide ion having the sequence LVNELTEFAK and which is derived from BSA. The mass chromatograms show that the peptide ions having a mass to charge ratio of mass to charge ratio 582.3 derived from BSA are present in both samples in roughly equal amounts whereas there is approximately a 100% difference in the intensity of peptide ion having a mass to charge ratio of 880.4 derived from Casein.

FIG. 12A show a parent or precursor ion mass spectrum recorded after around 20 minutes from the first sample and FIG. 12B shows a parent or precursor ion mass spectrum recorded after around substantially the same time from the second sample. The mass spectra show that the ions having a mass to charge ratio of 582.3 (derived from BSA) are approximately the same intensity in both mass spectra whereas ions having a mass to charge ratio of 880.4 which relate to a peptide ion from Casein are approximately twice the intensity in the second sample compared with the first sample. This is consistent with expectations.

Figure 12:
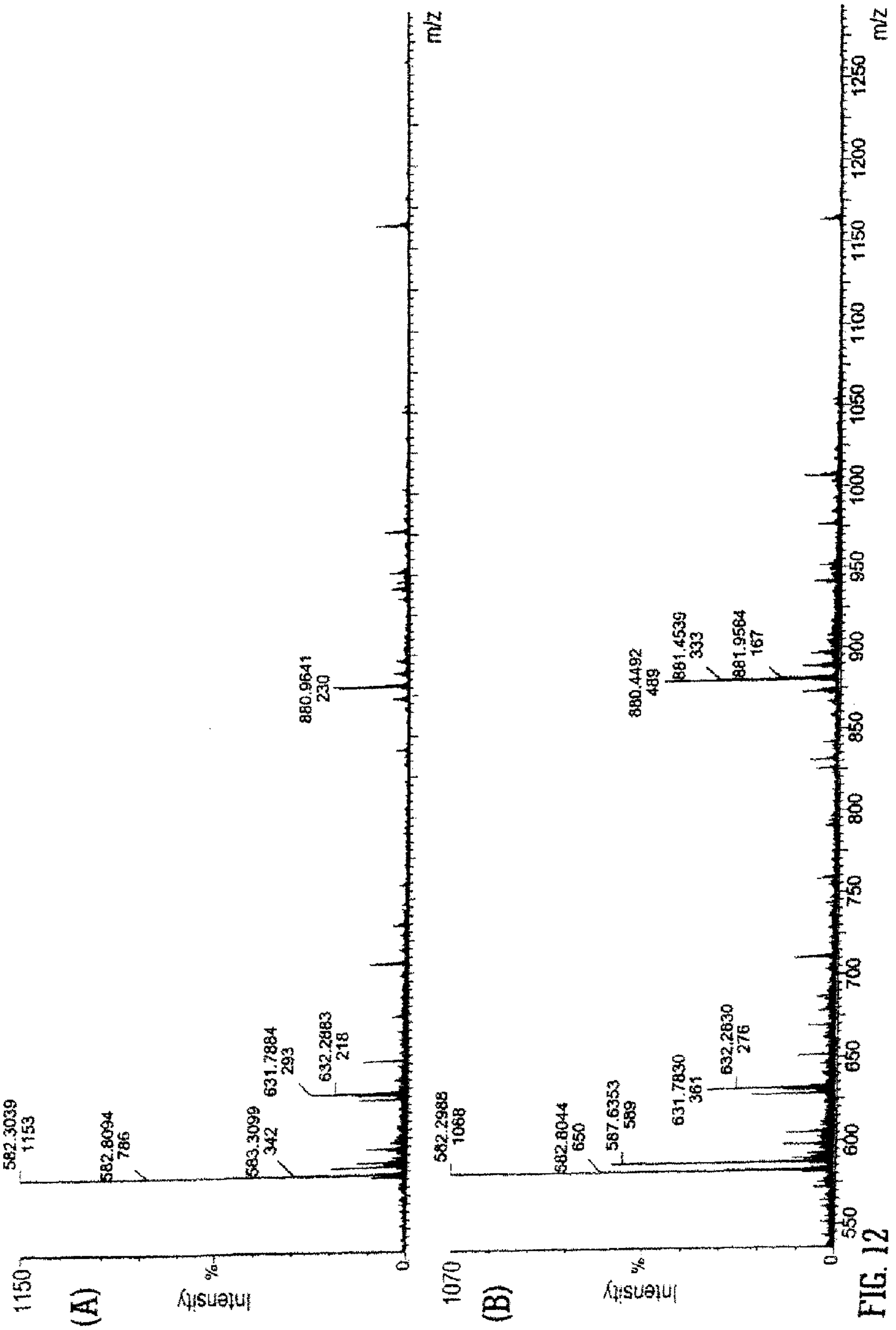
FIG. 12A shows a mass spectrum recorded from a first sample and FIG. 12B shows a corresponding mass spectrum recorded from a second sample which is similar to the first sample except that it contains a higher concentration of the digest products of the protein Casein which is common to both samples.
Figure 13:
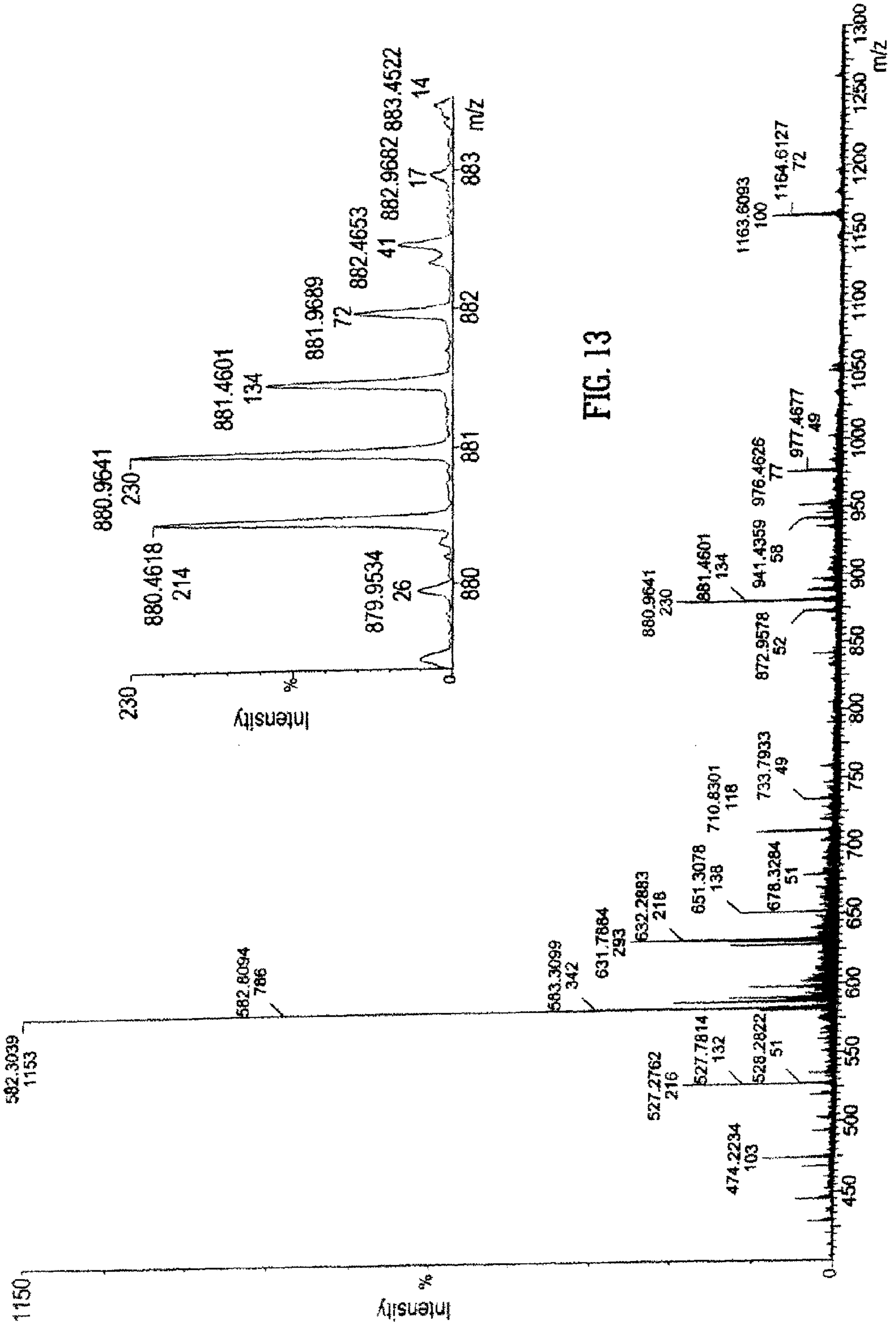
FIG. 13 shows the mass spectrum shown in FIG. 12A in more detail and the insert shows an expanded part of the mass spectrum showing isotope peaks at mass to charge ratio 880.4.
Figure 14:
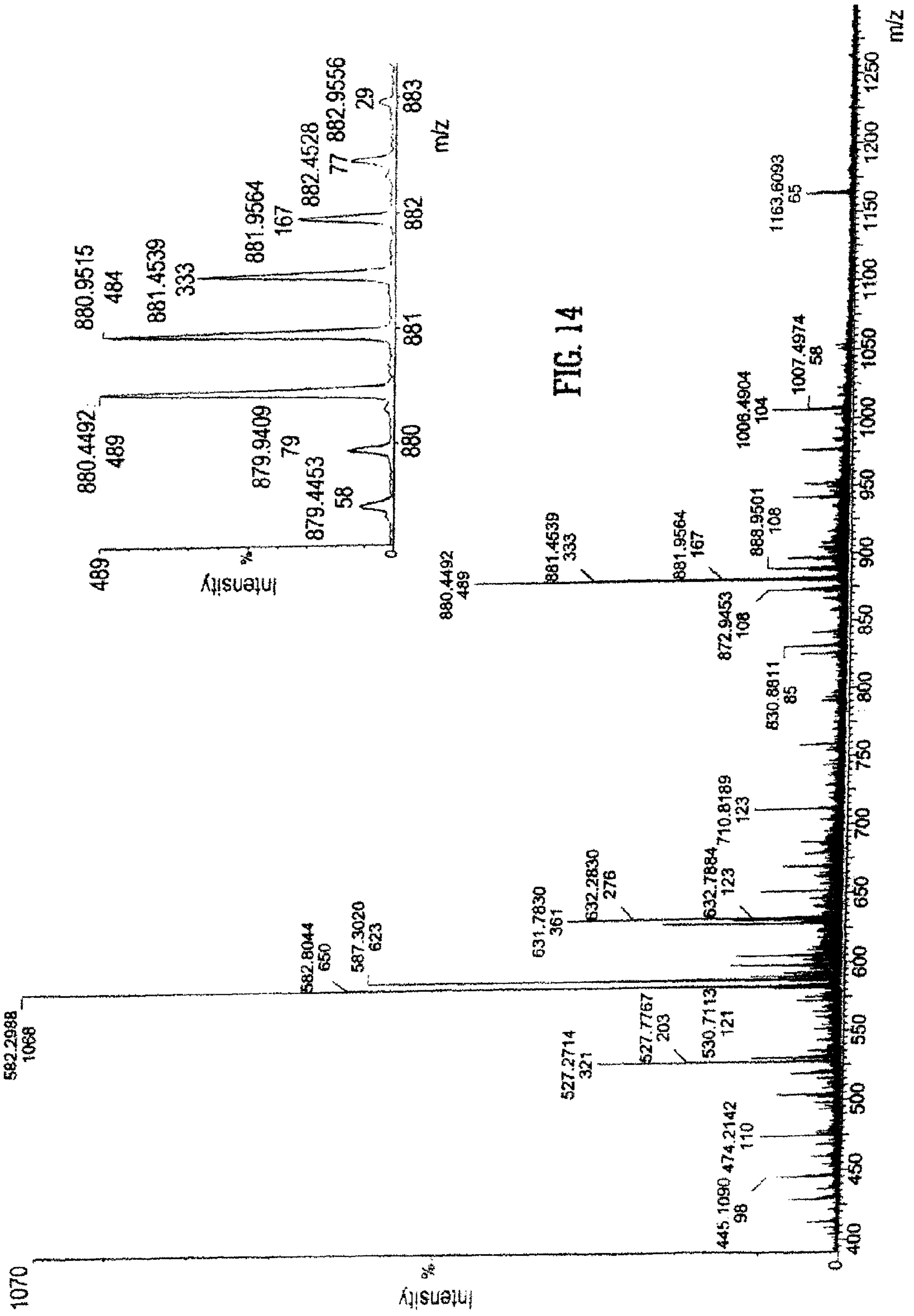
FIG. 14 shows the mass spectrum shown in FIG. 12B in more detail and the insert shows an expanded part of the mass spectrum showing isotope peaks at mass to charge ratio 880.4.

FIG. 13 shows the parent or precursor ion mass spectrum shown in FIG. 12A in more detail. Peaks corresponding with BSA peptide ions having a mass to charge of 582.3 and peaks corresponding with the Casein peptide ions having a mass to charge ratio of 880.4 can be clearly seen. The insert shows the expanded part of the spectrum showing the isotope peaks of the peptide ion having a mass to charge ratio of 880.4. Similarly, FIG. 14 shows the parent or precursor ion mass spectrum shown in FIG. 12B in more detail. Again, peaks corresponding with BSA peptide ions having a mass to charge ratio of 582.3 and peaks corresponding with the Casein peptide ions having a mass to charge ratio of 880.4 can be clearly seen. The insert shows the expanded part of the spectrum showing the isotope peaks of the peptide ion having a mass to charge ratio of 880.4. It is apparent from FIGS. 12-14 and from comparing the inserts of FIGS. 13 and 14 that the abundance of the peptide ion derived from Casein which has a mass spectral peak of mass to charge ratio 880.4 is approximately twice the abundance in the second sample compared with the first sample.

Although the present invention has been described with reference to preferred embodiments, it will be understood by those skilled in the art that various changes in form and detail may be made without departing from the scope of the invention as set forth in the accompanying claims.

The invention claimed is:

1. A method for analyzing a sample comprising a mixture of components, comprising:

forming precursor ions from the components of the sample;

alternately causing precursor ions to pass to and to bypass a collision, fragmentation or reaction device, to form product ions from at least some of the precursor ions that pass to the device, and to form substantially fewer product ions from precursor ions that bypass the device; and alternately obtaining mass spectra from product ions received from the collision, fragmentation or reaction device, and from precursor ions that bypassed the collision, fragmentation or reaction device.

2. The method of claim 1, wherein alternately causing precursor ions to pass to and to bypass the collision, fragmentation or reaction device comprises alternating for several tens of minutes.

3. The method of claim 2, wherein alternately obtaining mass spectra comprises obtaining several hundred mass spectra.

4. The method of claim 1, wherein alternately causing precursor ions to pass to and to bypass the collision, fragmentation or reaction device comprises alternating approximately every second.

5. The method of claim 1, wherein alternately causing precursor ions to pass to and to bypass the collision, fragmentation or reaction device comprises alternating in a time span approximately equal to one tenth of a chromatographic peak width.

6. The method of claim 1, further comprising, prior to forming precursor ions from the components, separating or partially separating different components of the mixture by means that causes the components to elute sequentially, providing an eluent over a period of time.

7. The method of claim 6, wherein the means that causes the components to elute performs High Performance Liquid Chromatography ("HPLC"), anion exchange, anion exchange chromatography, cation exchange, cation exchange chromatography, ion pair reversed-phase chromatography, chromatography, single-dimensional electrophoresis, multi-dimensional electrophoresis, size exclusion, affinity or reverse-phase chromatography, Capillary Electrophoresis Chromatography ("CEC"), electrophoresis, ion mobility separation, Field Asymmetric Ion Mobility Separation ("FAIMS") or capillary electrophoresis.

8. The method of claim 6, wherein alternately obtaining mass spectra comprises obtaining mass spectra sufficiently rapidly and close together in time that the mass spectra essentially correspond to the same eluting component or components.

9. The method of claim 8, further comprising associating precursor ions observed in a mass spectrum for a certain time period with product ions observed in a mass spectrum for a time period immediately before or after the certain time period.

10. The method of claim 6, further comprising producing, from the mass spectra of the sample, an elution profile for precursor ions and a pseudo-elution profile for product ions, and identifying precursor ions in response to correlations between the elution profiles of the precursor ions and the pseudo-elution profiles of the product ions.

11. The method of claim 10, wherein product ions, as determined from their pseudo-elution profiles, have substantially the same elution times as their related precursor ions.

12. The method of claim 10, further comprising determining the correlations between the profiles by comparing peaks of the profiles.

13. The method of claim 6, further comprising identifying precursor ions by comparing elution times of precursor ions with pseudo-elution times of product ions.

14. An apparatus for analyzing a sample comprising a mixture of components, comprising:

an ion source for forming precursor ions from the components of the sample;

a collision, fragmentation or reaction device for forming product ions from the precursor ions;

a bypass device disposed upstream of the collision, fragmentation or reaction device, wherein the bypass device is switchable to cause precursor ions to either pass to or to bypass the collision, fragmentation or reaction device, to form product ions from at least some of the precursor ions that pass to the collision, fragmentation or reaction device, and to form substantially fewer product ions from precursor ions that bypass the collision, fragmentation or reaction device; and a mass analyzer for alternately obtaining mass spectra from product ions received from the collision, fragmentation or reaction device, and from precursor ions that bypass the collision, fragmentation or reaction device.

15. The apparatus of claim 14, further comprising means for separating or partially separating different components of the mixture, and providing a sequential eluent of the components to the ion source over a period of time.

16. The method of claim 15, wherein the means for separating or partially separating performs High Performance Liquid Chromatography ("HPLC"), anion exchange, anion exchange chromatography, cation exchange, cation exchange chromatography, ion pair reversed-phase chromatography, chromatography, single-dimensional electrophoresis, multi-dimensional electrophoresis, size exclusion, affinity or reverse-phase chromatography, Capillary Electrophoresis Chromatography ("CEC"), electrophoresis, ion mobility separation, Field Asymmetric Ion Mobility Separation ("FAIMS") or capillary electrophoresis.

17. The apparatus of claim 14, wherein the mass analyzer comprises a time-of-flight mass analyzer.

18. The apparatus of claim 14, wherein the bypass device comprises an electrode.

19. The apparatus of claim 14, wherein the collision, fragmentation or reaction device is selected from the group consisting of: (i) a Surface Induced Dissociation ("SID") device; (ii) an Electron Transfer Dissociation device; (iii) an Electron Capture Dissociation device; (iv) an Electron Collision or Impact Dissociation device; (v) a Photo Induced Dissociation ("PID") device; (vi) a Laser Induced Dissociation device; (vii) an infrared radiation induced dissociation device; (viii) an ultraviolet radiation induced dissociation device; (ix) a nozzle-skimmer interface device; (x) an in-source device; (xi) an ion source Collision Induced Dissociation device; (xii) a thermal or temperature source device; (xiii) an electric field induced device; (xiv) a magnetic field induced device; (xv) an enzyme digestion or enzyme degradation device; (xvi) an ion-ion reaction device; (xvii) an ion-molecule reaction device; (xviii) an ion-atom reaction device; (xix) an ion-metastable ion reaction device; (xx) an ion-metastable molecule reaction device; (xxi) an ion-metastable atom reaction device; (xxii) an ion-ion reaction device; (xxiii) an ion-molecule reaction device; (xxiv) an ion-atom reaction device; (xxv) an ion-metastable ion reaction device; (xxvi) an ion metastable molecule reaction device; and (xxvii) an ion-metastable atom reaction device.

20. The apparatus of claim 14, wherein the ion source is selected from the group consisting of: (i) an Electrospray ion source; (ii) an Atmospheric Pressure Chemical Ionization ("APCI") ion source; (iii) an Atmospheric Pressure Photo Ionisation ("APPI") ion source; (iv) a Matrix Assisted Laser Desorption Ionisation ("MALDI") ion source; (v) a Laser Desorption Ionisation ("LDI") ion source; (vi) an Inductively Coupled Plasma ("ICP") ion source; (vi) a Fast Atom Bombardment ("FAB") ion source; (vii) a Liquid Secondary Ions Mass Spectrometry ("LSIMS") ion source; and (viii) an Atmospheric Pressure Ionisation ("API") ion source.

* * * * *